US012803165B2

(12) United States Patent
Chakravarty et al.

(10) Patent No.: US 12,803,165 B2
(45) Date of Patent: Nov. 17, 2026

(54) ELECTRONIC BEAM-STEERING REFLECTARRAY ANTENNA SYSTEM WITH VARACTOR DIODE EMBEDDED COMB-SHAPED UNIT CELL

(71) Applicant: Tata Consultancy Services Limited, Mumbai (IN)

(72) Inventors: Tapas Chakravarty, Kolkata (IN); Poornima Surojia, Hyderabad (IN); Ritvika Sonawane, Hyderabad (IN); Sai Sarath Chandra Chaitanya Sayinedi, Hyderabad (IN); Meda Lakshmi Narayana, Bangalore (IN); Soumya Chakravarty, Kolkata (IN); Rowdra Ghatak, Durgapur (IN)

(73) Assignee: Tata Consultancy Services Limited, Mumbai (IN)

( * ) Notice: Subject to any disclaimer, the term of this patent is extended or adjusted under 35 U.S.C. 154(b) by 267 days.

(21) Appl. No.: 18/651,432

(22) Filed: Apr. 30, 2024

(65) Prior Publication Data

US 2024/0372255 A1 Nov. 7, 2024

(30) Foreign Application Priority Data

May 5, 2023 (IN) ............................ 202321032134

(51) Int. Cl.
*H01Q 3/46* (2006.01)
*H01Q 9/16* (2006.01)
*H01Q 15/00* (2006.01)

(52) U.S. Cl.
CPC ................ *H01Q 3/46* (2013.01); *H01Q 9/16* (2013.01); *H01Q 15/0066* (2013.01)

(58) Field of Classification Search
CPC ........ H01Q 3/46; H01Q 9/16; H01Q 15/0066; H01Q 15/148; H01Q 19/108
See application file for complete search history.

(56) References Cited

FOREIGN PATENT DOCUMENTS

CN 109792106 A 5/2019

OTHER PUBLICATIONS

Wikipedia (Apr. 4, 2022). Dipole antenna. Internet Archive.https://web.archive.org/web/20220421142532/https://en.wikipedia.org/wiki/Dipole_antenna (Year: 2022).*

(Continued)

*Primary Examiner* — Nazra Nur Waheed
*Assistant Examiner* — Anna K. Benjamin Gosling
(74) *Attorney, Agent, or Firm* — Finnegan, Henderson, Farabow, Garrett & Dunner LLP

(57) ABSTRACT

This disclosure relates generally to electronic beam-steering reflectarray antenna system with varactor diode embedded comb-shaped unit cell. The present disclosure optimizes design of a plurality of comb-shaped unit cells arranged over a reflectarray metasurface. The plurality of comb-shaped unit cells designed as one of (i) a first unit cell structure and (ii) a second unit cell structure helps in tilting reflected beam over a desired direction. Moreover, a standard half-wavelength dipole antenna is integrated with the proposed reflectarray metasurface to produce electronically steerable antenna. The reflectarray metasurface is positioned at a predetermined height below the standard half-wavelength dipole antenna. Each of the plurality of comb-shaped unit cells is embedded with a commercially available varactor diode. These varactor diodes, when driven by appropriate direct current (DC) biasing voltages offer different capacitance values.

9 Claims, 32 Drawing Sheets

(56) References Cited

OTHER PUBLICATIONS

F. Venneri, S. Costanzo and G. Di Massa, "Design and Validation of a Reconfigurable Single Varactor-Tuned Reflectarray," in IEEE Transactions on Antennas and Propagation, vol. 61, No. 2, pp. 635-645, Feb. 2013, doi: 10.1109/TAP.2012.2226229. (Year: 2013).*

Cho et al. (Cho, K. W., Gummeson, J., and Abari, O. (Apr. 2023). mmWall: A Steerable, Transflective, Metamaterial surface for NextG mmWave Networks. Proceedings of the 20th USENIX Symposium on Networked Ssytems Design and Implementation. https://www.usenix.org/system/files/nsdi23-cho-kun-woo.pdf (Year: 2023).*

System Requirements: COMSOL Multiphysics Version 6.1 (Dec. 5, 2022). Accessed via Internet Archive. https://web.archive.org/web/20221205121403/https://www.comsol.com/system-requirements (Year: 2022).*

Budhu, J., Ventresca, N., and Grbic, A. (Nov. 21, 2022). Unit cell design for aperiodic metasurfaces. Arxiv. https://doi.org/10.48550/arXiv.2211.11588 (Year: 2022).*

Yang, Jun et al., "Fully Electronically Phase Modulation of Millimeter-Wave via Comb Electrodes and Liquid Crystal", Title of the item: IEEE Antennas and Wireless Propagation Letters, Date: Mar. 2021 vol. 20; Issue: 3, Publisher: IEEE, Link: https://ieeexplore.ieee.org//abstract/document/9316733.

Kahar, Manisha et al., "Fixed frequency electronically beam steering microstrip comb line antenna", Title of the item: Progress In Electromagnetics Research Symposium, Date: 2017, Publisher: IEEE.

Han, Feng-Yuan et al., "Terahertz Near-Field Metasurfaces: Amplitude—Phase Combined Steering and Electromagnetostatic Dual-Field Superfocusing", Title of the item: Advanced Optical Materials, Date: Jan. 2010, vol. 8; Issue: 6, Link: https://www.researchgate.net/publication/338459706_Terahertz_Near-Field_Metasurfaces_Amplitude-Phase_Combined_Steering_and_Electromagnetostatic_Dual-Field_Superfocusing.

* cited by examiner

ELECTRONIC BEAM-STEERING REFLECTARRAY ANTENNA SYSTEM WITH VARACTOR DIODE EMBEDDED COMB-SHAPED UNIT CELL

PRIORITY CLAIM

This U.S. patent application claims priority under 35 U.S.C. § 119 to: Indian provisional patent application No. 202321032134, filed on May 5, 2023. The entire contents of the aforementioned application are incorporated herein by reference.

TECHNICAL FIELD

The disclosure herein generally relates to the field of antenna based reflect array system, and, more particularly, to electronic beam-steering reflectarray antenna system with varactor diode embedded comb-shaped unit cell.

BACKGROUND

Globally, major initiative is ongoing to build components, sub-systems and systems for 5th generation (5G) millimeter wave Frequency Range 2 (FR2) band which offers many advantages. Some of its advantages are high data rate, ultra-high throughput, low latency and thereof. The abundant spectrum available at (5G) millimeter wave FR2 band (24 GHz+) make it an ideal candidate for various applications where electronically beam steered antenna is the critical component. Now-a-days a phased antenna array is the most prevalent technology used for beam steering antenna. Here the beam steering is achieved by establishing a reflection phase gradient across all antenna elements using digital phase shifters. For large, phased antenna arrays where large aperture size gives narrow beamwidth, the overall cost and the size for the beam steering may become too expensive. The phased antenna arrays consist of multiple antenna elements, wherein each antenna element is fed with different phase shifts to tilt the resultant beam in a desired direction. The main challenge in this type of architecture is that there must be a separate phase shifters network with many phase shifters. Further the phase shifters increase cost and complexity of the system.

To eliminate the usage of phase shifters, reconfigurable metasurfaces of different designs are utilized either with varactor diode or Positive-Intrinsic-Negative (PIN) diodes as a potential alternative approach. Metasurfaces are two-dimensional (2D) version of metamaterials with negligible thickness comprising several unit cells of sub-wavelength dimensions, arranged periodically over a substrate surface. The varactor diodes are placed in each of the unit cells in such a way to provide it with the direct current (DC) biasing network. Depending on proper size, orientation, and arrangement of the unit cell, the metasurface can transmit, reflect, or absorb an electromagnetic beam.

A tunable metasurface-based flat panel reflector with the integrated varactor diode or the PIN diode has been studied in recent times and different new designs of the same are explored. However, new designs which relate to a novel unit cell structures have continuously been explored for the purpose of higher frequency of operation, higher radiation efficiency, and higher frequency bandwidth, higher directivity, high efficiency, low profile, and ease of setting beam tilt angle with precision. Also, a precise technique of synthesizing and evaluating new unit cells is needed.

In metasurface based beam-steering antennas, the reflection phase gradient required for a desired beam tilt angle is computed using generalized Snell's law. Theoretically it is possible to obtain the required inter-element refection phase gradient by changing capacitance values embedded in each unit cell. But the implementation becomes significantly challenging since the reflection phase gradient rapidly changes with small changes in the capacitance values. Moreover, for wide beam tilt angle the reflection phase gradient need to cover entire range of 0 degree to 360 degree. However, there isn't any standard way to achieve the wide beam tilt angle to cover entire range of 0 degree to 360 degree for better designing the metasurface based beam-steering antennas.

SUMMARY

Embodiments of the present disclosure present technological improvements as solutions to one or more of the above-mentioned technical problems recognized by the inventors in conventional systems.

In an aspect, there is provided an electronic beam-steering reflectarray antenna system with varactor diode embedded comb-shaped unit cell comprising: a reflectarray metasurface positioned at a predetermined height below a standard half-wavelength dipole antenna; a plurality of comb-shaped unit cells arranged as a matrix over the reflectarray metasurface, wherein each of the plurality of comb-shaped unit cells is designed as one of (i) a first unit cell structure and (ii) a second unit cell structure, and wherein the first unit cell structure comprising: a comb shaped structure with a comb shaped first part and a comb shaped second part separated by a predefined gap to mount a varactor diode at a designated position, wherein the comb shaped first part comprising a first trunk, and a plurality of first arms comprising a first top arm, a first center arm and a first bottom arm, wherein the comb shaped second part comprising a second trunk, and a plurality of second arms comprising a second top arm, a second center arm, and a second bottom arm, and a structural design of the first trunk, the second trunk, the plurality of first arms and the plurality of second arms comprising a copper bottom layer reflector, a first dielectric substrate separating the copper bottom layer reflector and the comb shaped structure, wherein the first trunk and the second trunk has one or more X-directed copper patches, and the plurality of first arms and the plurality of second arms has a single Y-directed copper patches, wherein the first trunk spans across length of the comb-shaped unit cell along the X-direction, wherein the second center arm is of fixed length and connected to the copper bottom layer reflector through the first cylindrical metal post, and wherein a DC voltage fed to the varactor diode through the first trunk.

In accordance with an embodiment of the present disclosure, the design of the second unit cell structure comprising: a variation to the first unit cell structure with an additional copper layer positioned below the copper bottom layer reflector through a hole with the second cylindrical metal post from the first center arm, a second dielectric substrate separating the copper bottom layer reflector and the additional copper layer, and wherein length of the first trunk is less than length of the comb-shaped unit cell structure in the X-direction.

In accordance with an embodiment of the present disclosure, the electronic beam-steering reflectarray antenna system is controlled by a control unit comprising one or more hardware processors, coupled to a memory via one or more communication interfaces.

In accordance with an embodiment of the present disclosure, the one or more hardware processors are configured by the instructions to tilt the reflected beam in a desired direction, from the obtained plurality of reflection phase responses by: identifying, a reflection phase gradient of the reflectarray meta surface, from a plurality reflection phase responses corresponding to each of the plurality of unit cells for a desired angle received from a user; obtaining, a capacitance value of a plurality of capacitance values, for each of the plurality of unit cells, from the reflection phase gradient; mapping, the obtained plurality of capacitance values to the DC voltages corresponding to the varactor diodes using a predefined lookup table; and applying, suitable DC voltage to the varactor diode in each of the plurality of unit cells, to tilt the reflected beam over a desired direction.

In another aspect, a method for optimizing design of a first unit cell structure and a second unit structure is provided. The method includes optimizing, via an optimization technique executed by one or more hardware processors of a control unit controlling an electronic beam-steering reflectarray antenna system, a design of one of (i) a first unit cell structure and (ii) a second unit cell structure of a comb shaped unit cell of the electronic beam-steering reflectarray antenna system.

In accordance with an embodiment of the present disclosure, the optimization technique for optimizing the design of the first unit cell structure comprising: performing simulation comprising a mode1 simulation and a mode2 simulation on the first unit cell structure to (i) obtain an optimum comb arm length corresponding to the plurality of first arms, the second top arm, and the second bottom arm and (ii) estimate a plurality of reflection phase responses by: (a) setting a plurality of parameters of the first unit cell structure as constant values except comb arm length corresponding to the plurality of first arms, the second top arm, and the second bottom arm; (b) obtaining a plurality of frequency variations of an incident electromagnetic wave and a corresponding plurality of reflection phase responses of a reflected beam, without mounting the varactor diode on the first unit cell structure, for a plurality of comb arm length variations, wherein the comb arm length varies between first value and a second value by steps of a predefined value, wherein varying the comb arm length enables the plurality of frequency variations between a first frequency value and a second frequency value of the electromagnetic wave incident on the first unit cell structure, wherein the mode1 simulation comprises field lines of an electromagnetic wave incident parallel to the first trunk, and wherein the mode2 simulation comprises the field lines of the electromagnetic wave incident parallel to the plurality of first arms; (c) obtaining, the optimum comb arm length among the plurality of comb arm length variations from one of (i) the mode1 simulation and (ii) the mode2 simulation with a reflection phase response of the plurality of reflection phase responses greater than a predefined reflection phase and for a desired frequency of operation of the plurality of frequency variations; (d) mounting the varactor diode across the predefined gap between the comb shaped first part and the comb shaped second part; and (e) obtaining, the plurality of reflection phase responses, for each of the plurality of capacitance values of the DC voltage of the varactor diode, for the obtained optimum comb arm length and the desired frequency of operation.

In accordance with an embodiment of the present disclosure, the optimization technique for optimizing the design of the second unit cell structure comprising: performing simulation comprising mode1 simulation and a mode2 simulation on the second unit cell structure, (i) to obtain the optimum comb arm length corresponding to the plurality of first arms, the second top arm, and the second bottom arm and an optimum comb trunk length corresponding to the first trunk, and (ii) to estimate the plurality of reflection phase responses by: (a) setting the plurality of parameters of the second unit cell structure as constant values except the comb arm length corresponding to the plurality of first arms, the second top arm, and the second bottom arm, and length of the first trunk; (b) obtaining the plurality of frequency variations of an incident electromagnetic wave and the corresponding plurality of reflection phase responses of the reflected beam, without mounting the varactor diode on the second unit cell structure, for the plurality of comb arm length variations, wherein the comb arm length varies between first value and a second value by steps of a predefined value, wherein initially the length of the first trunk initialized with length of the comb-shaped unit cell; (c) obtaining, the optimum comb arm length among the plurality of comb arm length variations from one of (i) the mode1 simulation and (ii) the mode2 simulation, where the reflection phase response of the plurality of reflection phase responses greater than the predefined reflection phase and for the desired frequency of operation of the plurality of frequency variations; (d) obtaining the plurality of frequency variations of an incident electromagnetic wave and the corresponding plurality of reflection phase responses of the reflected beam, without mounting the varactor diode on the second unit cell structure, for the plurality of comb trunk length variations, wherein the comb trunk length varies between a first trunk length value and a second trunk length value by steps of the predefined value; (e) obtaining, the optimum comb trunk length among the plurality of comb trunk length variations from one of (i) the mode1 simulation and (ii) the mode2 simulation, where the reflection phase response of the plurality of reflection phase responses greater than the predefined reflection phase for the desired frequency of operation of the plurality of frequency variations; (f) mounting the varactor diode across the predefined gap between the comb shaped first part and the comb shaped second part; and (g) obtaining, the plurality of reflection phase responses, for each of the plurality of capacitance values of the DC voltage of the varactor diode, for the obtained optimum comb arm length, the optimum comb trunk length, and the desired frequency of operation.

In accordance with an embodiment of the present disclosure, the one or more hardware processors are configured by the instructions to tilt the reflected beam in a desired direction, from the obtained plurality of reflection phase responses by: identifying, a reflection phase gradient of the reflectarray meta surface, from a plurality reflection phase responses corresponding to each of the plurality of unit cells for a desired angle received from a user; obtaining, a capacitance value of a plurality of capacitance values, for each of the plurality of unit cells, from the reflection phase gradient; mapping, the obtained plurality of capacitance values to the DC voltages corresponding to the varactor diodes using a predefined lookup table; and applying, suitable DC voltage to the varactor diode in each of the plurality of unit cells, to tilt the reflected beam over the desired direction.

In yet another aspect, there are provided one or more non-transitory machine-readable information storage mediums comprising one or more instructions which when executed by one or more hardware processors cause a method for optimizing design of a first unit cell structure and a second unit structure is provided. The method includes optimizing, via an optimization technique executed by one or more hardware processors of a control unit controlling an electronic beam-steering reflectarray antenna system, a design of one of (i) a first unit cell structure and (ii) a second unit cell structure of a comb shaped unit cell of the electronic beam-steering reflectarray antenna system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
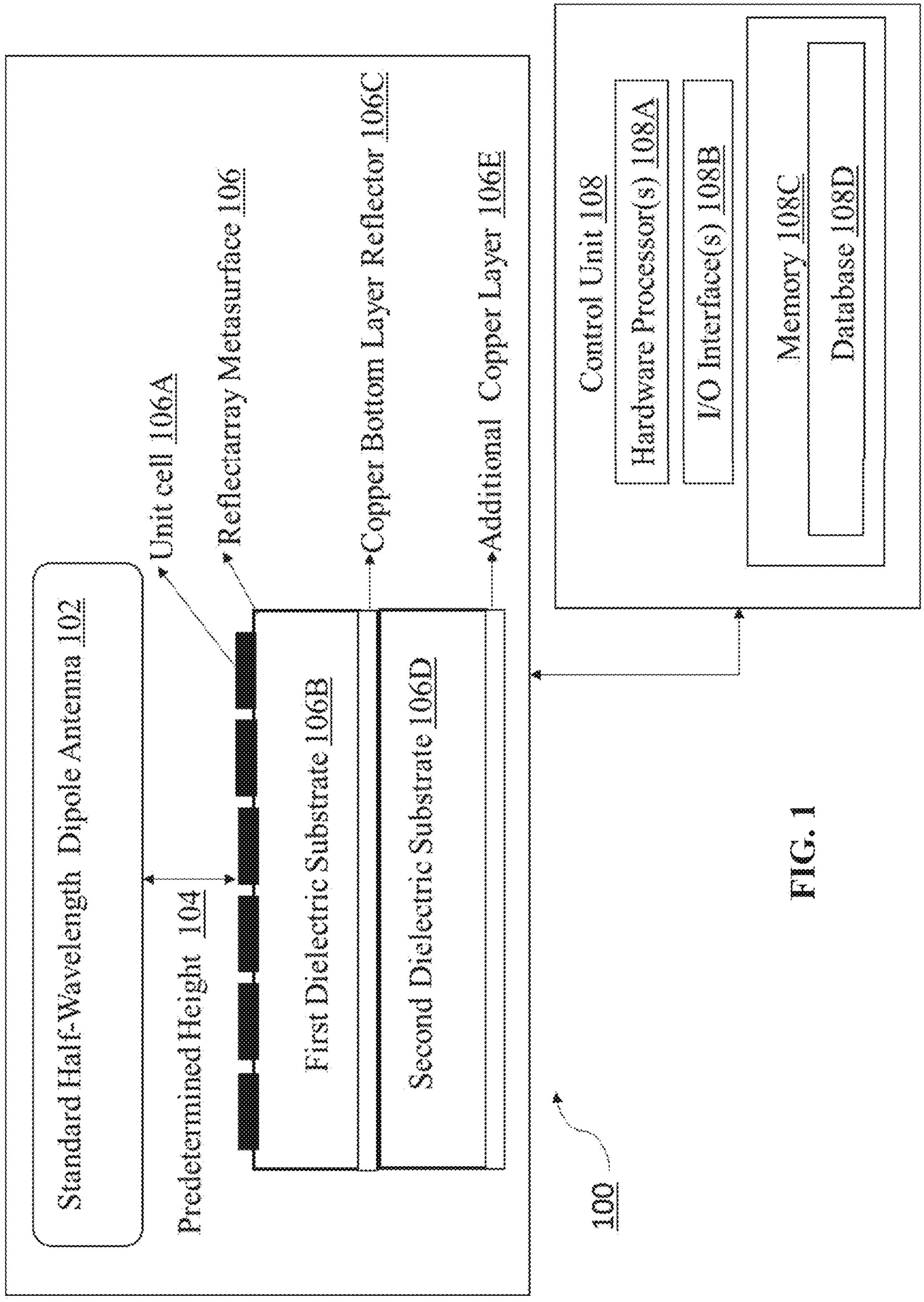
FIG. 1 illustrates an exemplary block diagram of an electronic beam-steering reflectarray antenna system with varactor diode embedded comb-shaped unit cell, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

For better designing of metasurface based beam-steering antennas, size, shape, and periodicity of a plurality of comb-shaped unit cells and a corresponding plurality of refection phase responses of the plurality of comb-shaped unit cells need to be investigated.

The present disclosure optimizes design of the plurality of comb-shaped unit cells arranged over a reflectarray metasurface. The plurality of comb-shaped unit cells is designed as one of (i) a first unit cell structure and (ii) a second unit cell structure. Moreover, a standard half-wavelength dipole antenna is integrated with the proposed reflectarray metasurface to produce electronically steerable antenna. The reflectarray metasurface is positioned at a predetermined height below the standard half-wavelength dipole antenna. Each of the plurality of comb-shaped unit cell is embedded with a commercially available varactor diode. These varactor diodes, when driven by appropriate direct current (DC) biasing voltages offer different capacitance values.

If each of the plurality of comb-shaped units cell gets different DC bias voltages, then the reflectarray metasurface gets transformed to a programmable structure whose reflection phase gradient can be adjusted which in turn helps in tilting a reflected beam over a desired direction. The DC bias voltage adjustment is controlled digitally where the user feeds the desired angle which leads to computing the necessary reflection phase gradient (Generalized Snell's law) followed by selecting necessary capacitance values and the corresponding DC bias voltages for each of the plurality of comb-shaped unit cells. The plurality of comb-shaped unit cells designed as the first unit cell structure helps in tilting the reflected beam over the desired direction in a single line. The plurality of comb-shaped unit cells designed as the second unit cell structure helps in tilting the reflected beam over the desired direction in a two-dimensional (2D) plane.

In the context of the subject disclosure, definitions of certain expressions and their usage are as explained herein below.

Metamaterials are artificial structures consisting of periodic inclusions or unit cells that show exotic properties. The precise geometry, size and orientation of the unit cell structures render them capable of manipulating electromagnetic waves, like blocking, absorbing, enhancing, or bending the electromagnetic waves. Potential applications of the metamaterials include high efficiency absorbers/rasorbers, invisibility cloaks, medical devices and thereof.

Metasurfaces are planar metamaterials with subwavelength thickness comprised of single-layer or multi-layer planar structures which can be readily fabricated using cost-effective methods like nano-printing. In recent times, metasurfaces, the two-dimensional counterpart of metamaterials, provide an alternative scheme to manipulate the electromagnetic waves by arranging the artificial structures on a flat interface to engineer the phase profile, polarization, amplitude, and trajectory of electromagnetic waves. The subwavelength thickness, low loss, and easy fabrication can be exhibited for the planar metasurfaces. Hence, it is important to develop novel metasurfaces for controlling the electromagnetic waves. The metasurfaces are ultra-thin, low-cost, easily fabricated structures that are used when low-profile structures are needed. The metasurfaces provide a planar surface with surface impedance which can be specially designed to be manipulated by electronic means and can control the phase and group velocities of plane waves for wave-front engineering, polarization control, cloaking, scatter reduction coating and thereof.

Unit cell is the simplest repeating unit in the metamaterial or the metasurface array structure that embodies all the structural properties of the full array, and the periodic inclusion of this unit cell constitutes the entire structure. The properties of an individual unit cell are replicated across the entire array.

Floquet port is used for simulating planar-periodic structures like metasurfaces and frequency selective surfaces (FSS) when these may be idealized as infinitely large. The analysis of the infinitely large structure is then accomplished by analysing a unit cell, and the reflection or transmission characteristics of the unit cell are assumed to be replicated infinitely in all directions in which the unit cell is repeated periodically to form the array. The Floquet port is designed for this purpose. Fundamentally, Floquet modes, i.e., the field modes assumed to be created at the port boundaries, are plane waves with propagation direction set by the frequency, phase, and geometry of the periodic structure.

A reflectarray consists of an array of unit cells, illuminated by a feeding antenna. The unit cells are usually backed by a ground plane, and the incident wave reflects from the surface of the array of the unit cells towards the direction of the beam. A phase distribution is applied on the unit cells to focus the wavefronts from the feeding antenna into a plane wave (to account for the different path lengths from the feeding antenna to each unit cell). A progressive phase shift can be applied to the unit cells to steer the beam direction.

Reflection phase at each unit cell determines the overall beamwidth and direction. Ideally, the total phase shift range would be 360°. A reconfigurable reflectarray has unit cells whose phase can be electronically controlled in real-time to steer the beam or change its shape. Several methods can be used to implement reconfigurable reflectarray unit cells, including Positive-Intrinsic-Negative (PIN) diodes and novel materials.

Varactor diodes are diodes that can provide variable capacitance depending on the input DC voltage to the diode. The relation between capacitance (C) and input DC voltage (V) is given as $C \propto 1/V$. This varactor diode property has been modeled in simulation by assuming just a simple capacitor connecting the two points in the unit cell geometry where the diode would be present, and then the different reflection phase properties of the unit cell at a particular frequency is found out by changing this capacitance value. In this way the phase curves at different frequencies and different capacitance values are recorded. The unit cells in the resulting metasurface array have been provided different reflection phases by varying this capacitance, in a way that subsequent unit cells in from one side of the array to the other have a progressive phase shift gradient. Thus, beam steering is achieved.

Phased array is an electronically scanned array or a computer-controlled array of antenna which creates a beam of radio waves that can be electronically steered to point in different directions without moving the antennas. In a phased array antenna, the radio frequency current from the transmitter is fed to multiple individual antenna elements with the proper phase shift gradient so that the radio waves from the separate elements combine (superpose) to form beams, with increased radiated power in desired directions and suppressed radiation in undesired directions. In a phased array, the power from the transmitter is fed to the radiating elements through devices called phase shifters, controlled by a computer system, which can alter the phase or signal delay electronically, thus steering the beam to a different direction.

The generalized Snell's law is applied in the case where there is an abrupt phase shift (also called phase discontinuity) at the interface between two media, e.g., at the surface of a metasurface array, where the subsequent unit cells have been provided a progressive phase shift by changing the capacitance values. It is derived from Fermat's principle. Assuming the phase shift gradient $$\left(\frac{d\Phi}{(dx)}\right)$$

along the interface is constant, then the law is stated as:

$$\sin(\theta_r) - \sin(\theta_i) = \frac{\lambda_0}{2\pi n_i}\frac{d\Phi}{dx} \quad (1)$$

Where $\theta_r$, is reflection angle, $\theta_i$ is incidence angle, $n_i$ is refractive index of the medium in which reflection is taking place, and $n_i$ is wavelength of operation. From eqn. (1), it is observed that the reflection angle changes non-linearly with the change in incidence angle, i.e., the reflected beam can have an arbitrary direction provided a suitable reflection phase gradient is introduced at the interface. This is different from the Classical Snell's law of reflection. In fact, classical law is a special case of generalized law, when the reflection phase gradient becomes equal to 0. This equation is the basis behind the design of phased array or reflectarray.

Referring now to the drawings, and more particularly to FIG. 1 through FIG. 17B, where similar reference characters denote corresponding features consistently throughout the figures, there are shown preferred embodiments and these embodiments are described in the context of the following exemplary system and/or method.

FIG. 1 illustrates an exemplary block diagram of an electronic beam-steering reflectarray antenna system 100, in accordance with some embodiments of the present disclosure. The embodiment the electronic beam-steering reflectarray antenna system 100 comprises the reflectarray metasurface 106 positioned at the predetermined height 104 below the standard half-wavelength dipole antenna 102. The plurality of comb-shaped unit cells 106A arranged as a matrix over the reflectarray metasurface 106. The plurality of comb-shaped unit cells 106A is designed as one of (i) the first unit cell structure 300 and (ii) the second unit cell structure 400.

Figure 2A:
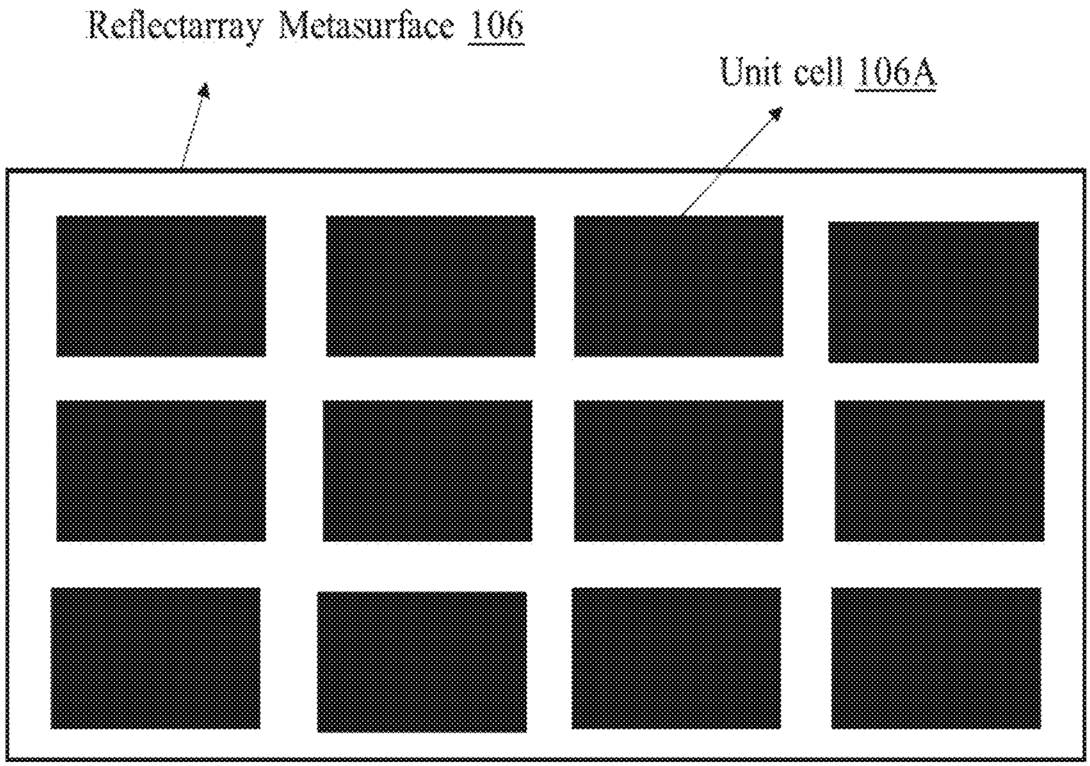
FIGS. 2A, and 2B illustrate an exemplary representation (not to scale) of a top view and a side view, respectively of a reflectarray metasurface comprising arrangement of a plurality of comb-shaped unit cells equally spaced as a matrix, in accordance with some embodiments of the present disclosure.
Figure 2B:
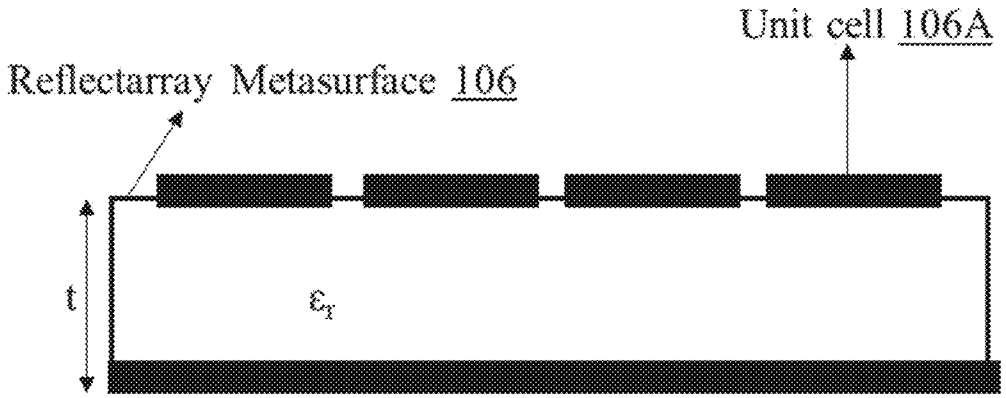

FIGS. 2A, and 2B illustrate an exemplary representation (not to scale) of a top view and a side view, respectively of the reflectarray metasurface 106A comprising arrangement of the plurality of comb-shaped unit cells 106A equally spaced as the matrix, in accordance with some embodiments of the present disclosure. The dimensions of the matrix illustrated are representative of an exemplary embodiment, t represents thickness of the first dielectric substrate 106B and $\in_r$ represents dielectric constant. Shape and size of plurality of comb-shaped unit cells 106A together with the thickness and the dielectric constant of the first dielectric substrate 106B determine a frequency of operation. In an embodiment, each of the plurality of comb-shaped unit cells 106A is square shaped with outer dimension being P×P where P is defined as periodicity, and the shape of the first dielectric substrate an second dielectric substrate are rectangular.

The electronic beam-steering reflectarray antenna system 100 further comprises a first dielectric substrate 106B separating a copper bottom layer reflector 106C and the plurality of comb-shaped unit cells 106A, a second dielectric substrate 106D separating the copper bottom layer reflector 106C and an additional copper layer 106E comprising a plurality of copper pads.

The electronic beam-steering reflectarray antenna system 100 is controlled by a control unit 108. The control unit 108 comprises one or more data storage devices or memory 108C configured to store instructions, one or more communication interfaces 108B, and one or more hardware processors 108A operatively coupled to the one or more data storage devices 108C via the one or more communication interfaces 108C, wherein the one or more hardware processors 108A are configured by the instructions to perform beam steering.

In an embodiment, the one or more hardware processors 108A can be implemented as one or more microprocessors, microcomputers, microcontrollers, digital signal processors, central processing units, state machines, logic circuitries, and/or any devices that manipulate signals based on operational instructions. Among other capabilities, the processor(s) 108A is/are configured to fetch and execute computer-readable instructions stored in the memory. In the context of the present disclosure, the expressions 'processors' and 'hardware processors' may be used interchangeably. In an embodiment, the electronic beam-steering reflectarray antenna system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

In an embodiment, the communication interface(s) or input/output (I/O) interface(s) 108B can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The one or more data storage devices or memory 108C may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The one or more hardware processors 108A of the control unit 108 configured by instructions to execute an optimization technique for optimizing the design of the first unit cell structure 300 and the second unit cell structure 400 to obtain a plurality of reflection phase responses. The one or more hardware processors 108A are configured by the instructions to tilt the reflected beam in the desired direction, from the obtained plurality of reflection phase responses.

In an embodiment, a database 108D is comprised in the memory 108C, wherein the database 108D comprises information on a plurality of parameters corresponding to the plurality of comb-shaped unit cells. The memory 108C further includes a plurality of modules (not shown), such modules for various technique(s) such as a Snell's law, a standard Floquet port analysis.

The above-mentioned technique(s) are implemented as at least one of a logically self-contained part of a software program, a self-contained hardware component, and/or, a self-contained hardware component with a logically self-contained part of a software program embedded into each of the hardware component (e.g., hardware processor 108A or memory 108C) that when executed perform the method described herein. The memory 108C further comprises (or may further comprise) information pertaining to input(s)/output(s) of each step performed by the systems and methods of the present disclosure. In other words, input(s) fed at each step and output(s) generated at each step are comprised in the memory 108C and can be utilized in further processing and analysis.

Figure 3:
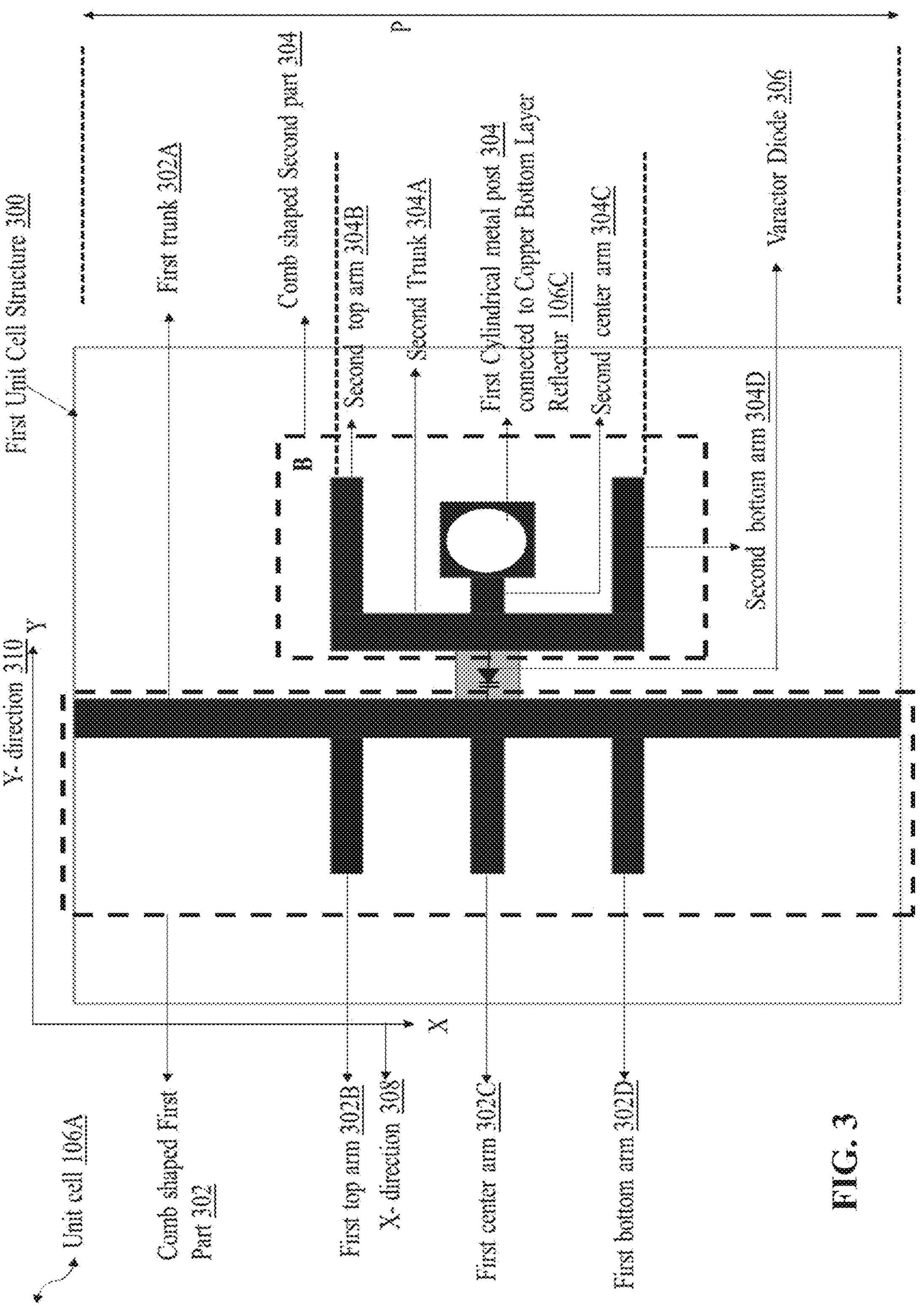
FIG. 3 illustrates an exemplary design of one type of comb-shaped unit cells referred as a first unit cell structure of the electronic beam-steering reflectarray antenna system with varactor diode embedded comb-shaped unit cell, in accordance with some embodiments of the present disclosure.

FIG. 3 illustrates an exemplary design of one type of comb-shaped unit cells referred as the first unit cell structure 300 of the electronic beam-steering reflectarray antenna system 100 with varactor diode embedded comb-shaped unit cell, in accordance with some embodiments of the present disclosure. The design of the first unit cell structure 300 comprises a comb-shaped structure with a comb-shaped first part 302 and a comb-shaped second part 304 separated by a predefined gap to mount the varactor diode 306 at a designated position. The comb-shaped first part 302 comprises a first trunk 302A, and a plurality of first arms comprises a first top arm 302B, a first center arm 302C and a first bottom arm 302D. The comb-shaped second part 304 comprises a second trunk 304A, and a plurality of second arms comprises a second top arm 304B, a second center arm 304C, and a second bottom arm 304D. A structural design of the first trunk 302A, the second trunk 304A, the plurality of first arms and the plurality of second arms comprises a copper bottom layer reflector 106C, a first dielectric substrate 106B separating the copper bottom layer reflector 106C and the comb-shaped structure. The first trunk 302A and the second trunk 304A has one or more X-directed copper patches, and the plurality of first arms and the plurality of second arms has a single Y-directed copper patch. The first trunk 302A spans across length of the comb-shaped unit cell along the X-direction 308. The second center arm 304C is of fixed length and connected to the copper bottom layer reflector 106C through the first cylindrical metal post 304, and wherein a DC voltage fed to the varactor diode 306 through the first trunk 302A.

Figure 4:
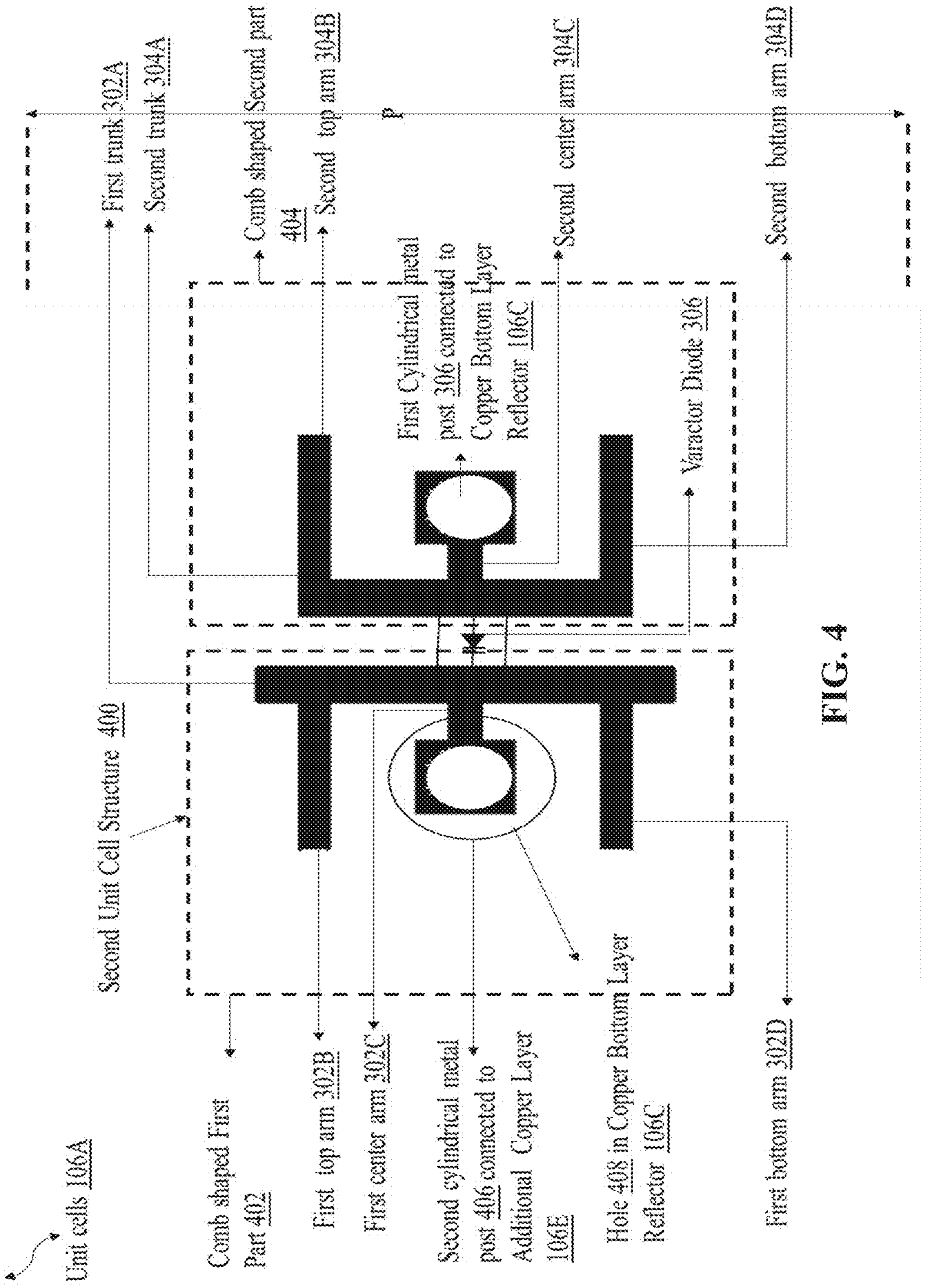
FIG. 4 illustrates an exemplary design of another type of comb-shaped unit cells referred as a second unit cell structure of the electronic beam-steering reflectarray antenna system with varactor diode embedded comb-shaped unit cell, in accordance with some embodiments of the present disclosure.

FIG. 4 illustrates an exemplary design of the second unit cell structure 400 of the electronic beam-steering reflectarray antenna system 100 with varactor diode embedded comb-shaped unit cell, in accordance with some embodiments of the present disclosure. The design of the second unit cell structure 400 is a variation to the first unit cell structure 300 with the additional copper layer 106E positioned below the copper bottom layer reflector 106C through a hole 408 with the second cylindrical metal post 406 from the first center arm 302C, a second dielectric substrate 106D separating the copper bottom layer reflector 106C and the additional copper layer 106E, and wherein length of the first trunk 302A is less than length of the comb-shaped unit cell in the X-direction 308.

Figure 5A:
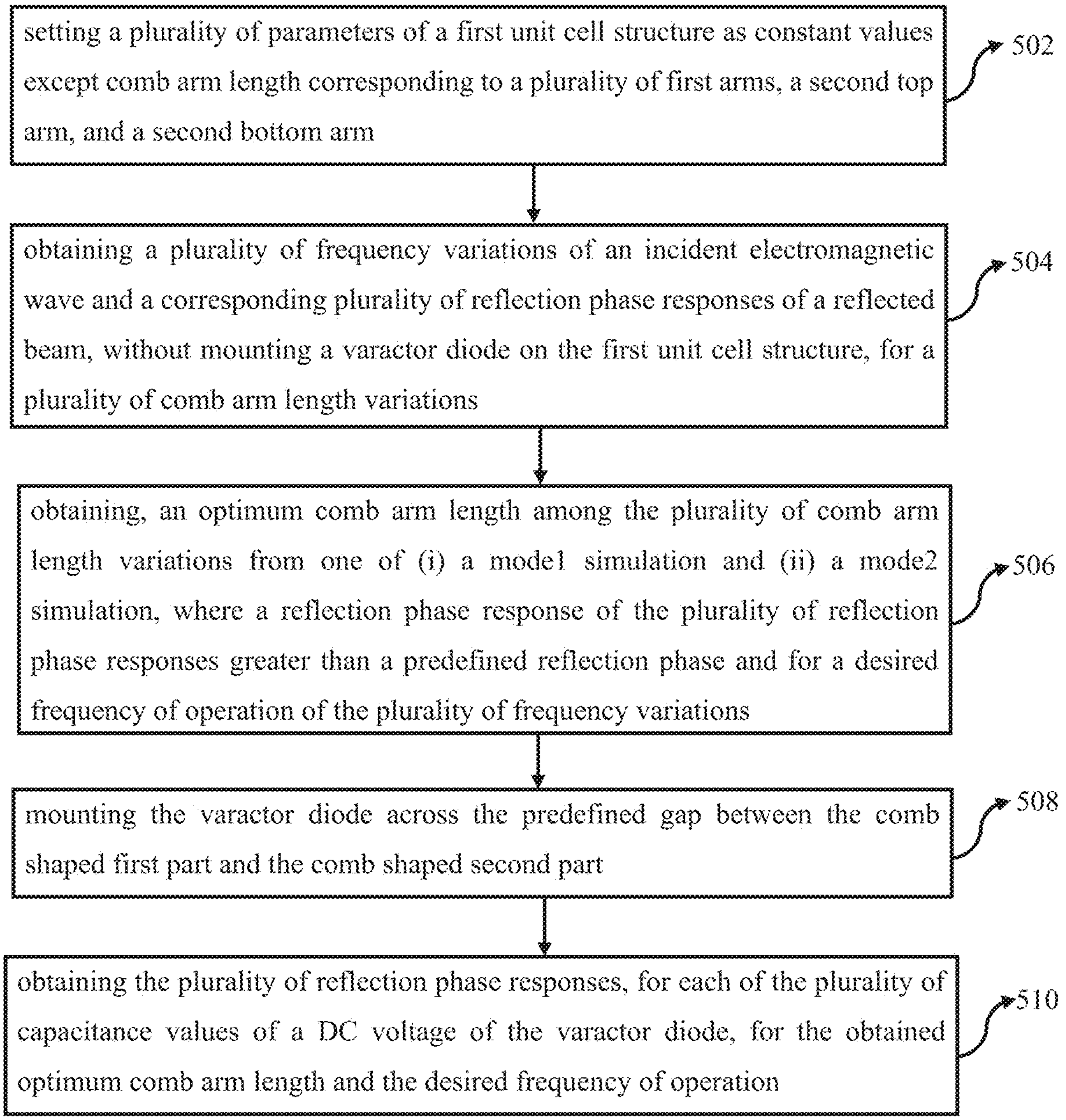
FIG. 5A depicts flow diagram illustrating a method for optimizing the design of the first unit cell structure and FIGS. 5B and 5C depict a flow diagram illustrating a method for optimizing the design of the second unit cell structure of the electronic beam-steering reflectarray antenna system, in accordance with some embodiments of the present disclosure.
Figure 5B:
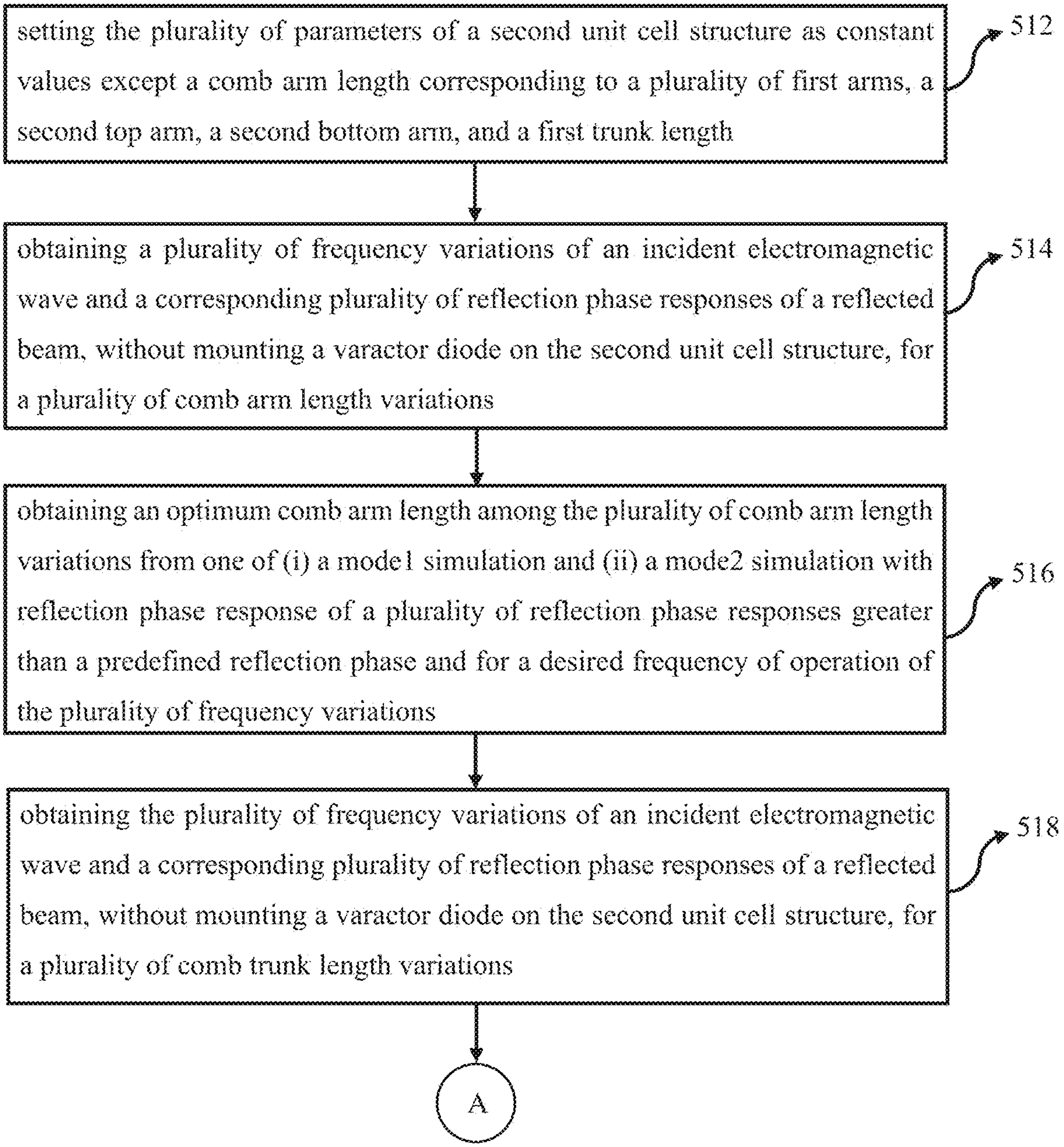
Figure 5C:
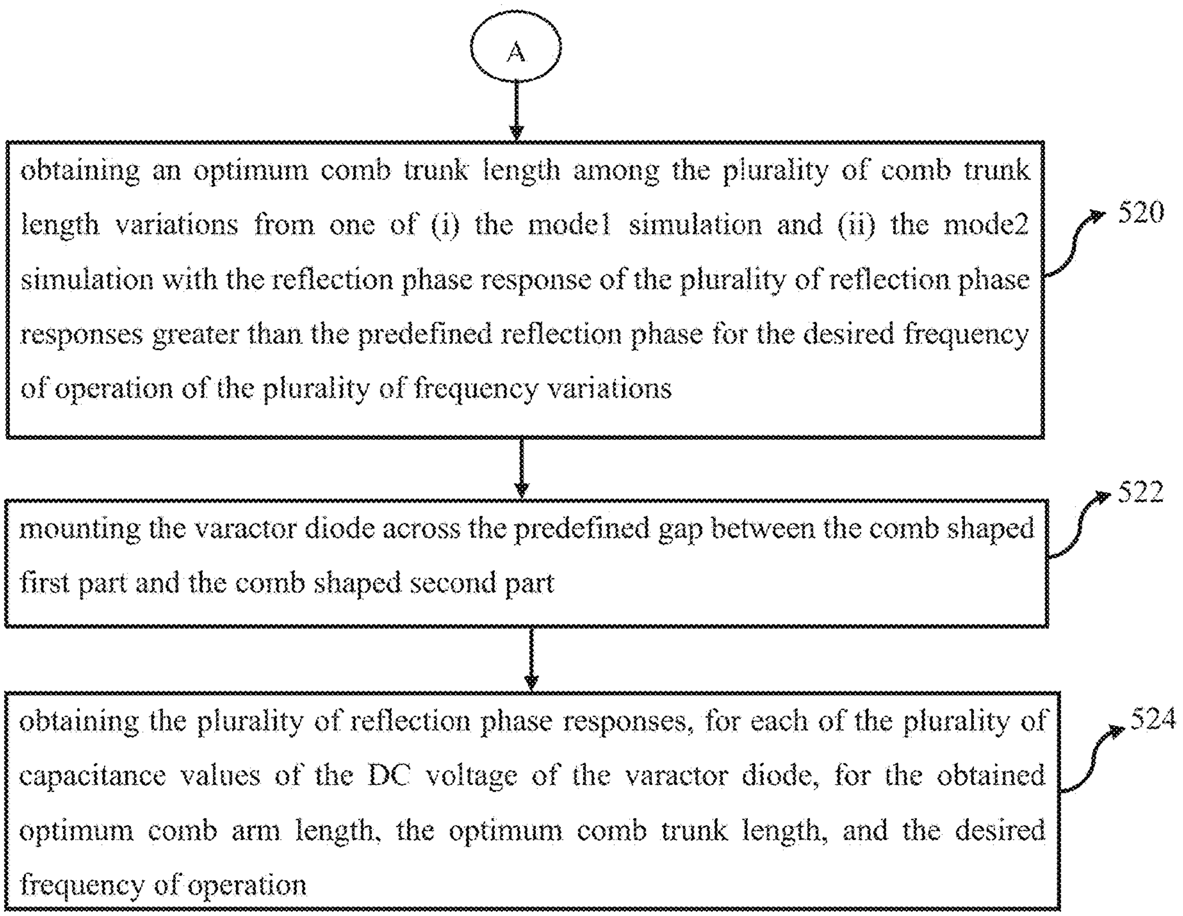

FIG. 5A depicts flow diagram illustrating a method for optimizing the design of the first unit cell structure 300 and FIGS. 5B, and 5C depict a flow diagram illustrating a method for optimizing the design of the second unit cell structure 400 of the electronic beam-steering reflectarray antenna system 100, in accordance with some embodiments of the present disclosure. In an embodiment, the electronic beam-steering reflectarray antenna system 100 comprises one or more data storage devices or the memory 108C operatively coupled to the one or more hardware processors 108A and is configured to store instructions for execution of steps of the method depicted in FIG. 5A and the method depicted in FIGS. 5B, and 5C by the one or more processors 108A. The steps of the method depicted using flow diagram of FIG. 5A of the present disclosure will now be explained with reference to components of the electronic beam-steering reflectarray antenna system 100 of FIG. 1 and FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to steps of FIG. 5A, at step 502 of the present disclosure, the one or more hardware processors 108A set, the plurality of parameters of the first unit cell structure 300 as constant values except comb arm length corresponding to the plurality of first arms, the second top arm 304B, and the second bottom arm 304D. Initially the plurality of parameters of the first unit cell structure 300 are fixed to constant values by:

Defining the frequency of operation f (GHz), for example f=27 GHz.

Computing corresponding half-wavelength $\lambda/2$ (mm)=300/f, for example, $\lambda/2$=5.55 mm.

Assign periodicity P=$\lambda/2$ (approximately in the range 0.46$\lambda$ to 0.5$\lambda$), for example, P=5.3 mm.

Identifying the suitable varactor diode make from commercially available components, for example, MAVR-000120-1411 (https://www.macom.com/products/product-detail/MAVR-000120-14110P).

Extracting total capacitance versus reverse bias values and the operating range from the Data Sheet, for example, MAVR-000120-1411 is shown to work between 150fF (at −10V) to 900fF (at −1V).

Identifying from the datasheet minimum and maximum space required for mounting the varactor diode and define a suitable value in this range (that is between minimum and maximum) as gap between the comb-shaped first part 302 and the comb-shaped second part 304, for example for mounting the varactor diode 306 MAVR-000120-1411, the gap is defined as 0.4 mm (in the range 0.32 mm to 0.49 mm).

Defining the first dielectric substrate 1106B and the second dielectric substrate 106D from the commercially available substrates, for example, $\varepsilon_r$=2.2 and t=0.787 mm.

The plurality of parameters of the first unit cell structure 300 are shown in Table 1.

TABLE 1

| Parameters | Parameter name | Dimension Value (mm) |
|---|---|---|
| Periodicity of the first unit cell structure | P | 5.3 |

TABLE 1-continued

| Parameters | Parameter name | Dimension Value (mm) |
|---|---|---|
| Width of the first trunk and the second trunk | Wt | 0.3 |
| Comb arm length of the plurality of first arms, second top arm, second bottom arm | La | variable |
| Width of plurality of first arms and plurality of second arms | Wa | 0.2 |
| Comb arm span | Ls | 2 |
| Gap between comb-shaped first part and Comb-shaped second part | G | 0.4 |
| Pad for shorting cylindrical metal post | pad | 0.6 |
| Diameter of shorting cylindrical metal post | — | 0.5 |
| first dielectric substrate thickness | t | 0.787 |
| first dielectric substrate constant | $\varepsilon_r$ | 2.2 |

Figure 6A:
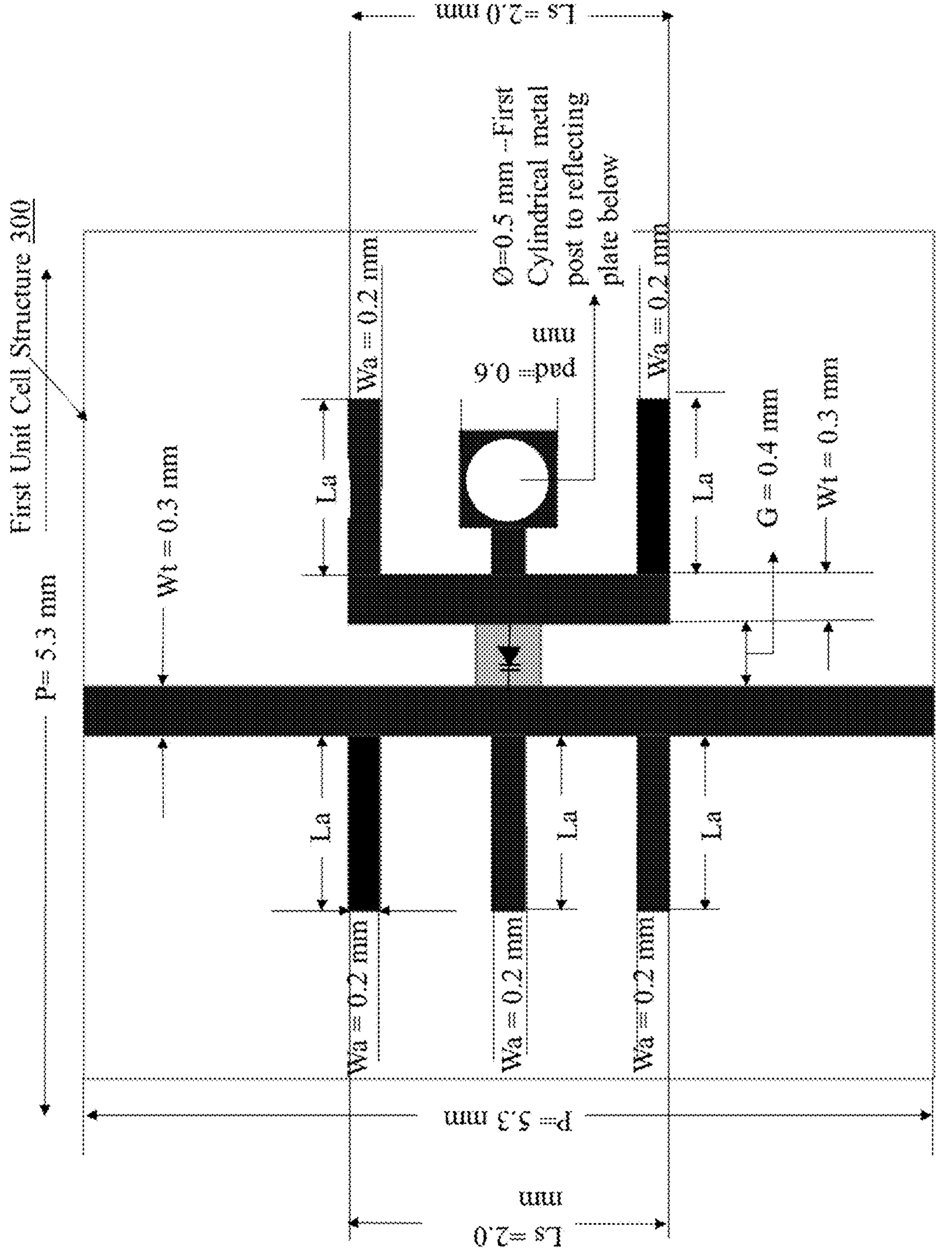
FIGS. 6A, and 6B illustrates an exemplary representation of a top view and a side view, respectively of the first unit cell structure of the electronic beam-steering reflectarray antenna system with varactor diode embedded comb-shaped unit cell, in accordance with some embodiments of the present disclosure.
Figure 6B:
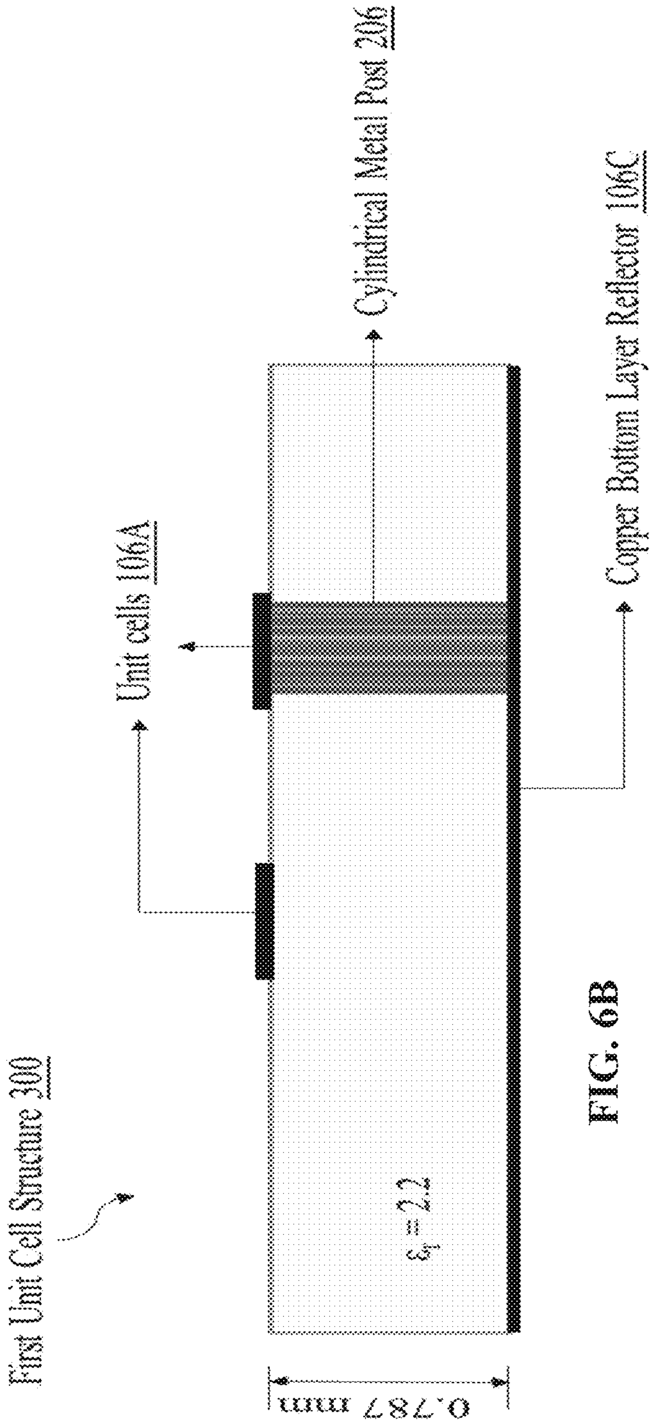

FIGS. 6A, and 6B illustrates an exemplary representation of a top view and a side view, respectively of the first unit cell structure 300 of the electronic beam-steering reflectarray antenna system with varactor diode embedded comb shaped unit cell. More specifically dimension values in the top view and the side view, respectively of the first unit cell structure 300 are represented in FIGS. 6A and 6B, in accordance with some embodiments of the present disclosure.

At step 504 of the present disclosure, the one or more hardware processors 108A obtain, a plurality of frequency variations of an incident electromagnetic wave and a corresponding plurality of reflection phase responses of the reflected beam, without mounting the varactor diode 306 on the first unit cell structure 300, for a plurality of comb arm length variations, over a mode1 simulation and a mode2 simulation. The comb arm length varies between first value and a second value by steps of a predefined value. Varying the comb arm length enables the plurality of frequency variations between a first frequency value and a second frequency value of the electromagnetic wave incident on the first unit cell structure. A standard Floquet port analysis is conducted for the first unit cell structure 300 where the comb arm length is varied from 0.5 mm to 1.5 mm in steps of 0.05 mm, in accordance with some embodiments of the present disclosure. Further model simulation and the mode2 simulation is performed for each of the comb arm length. The mode1 simulation comprises field lines of the electromagnetic wave incident parallel to the first trunk 302A, and wherein the mode2 simulation comprises the field lines of the electromagnetic wave incident parallel to the plurality of first arms.

Figure 7A:
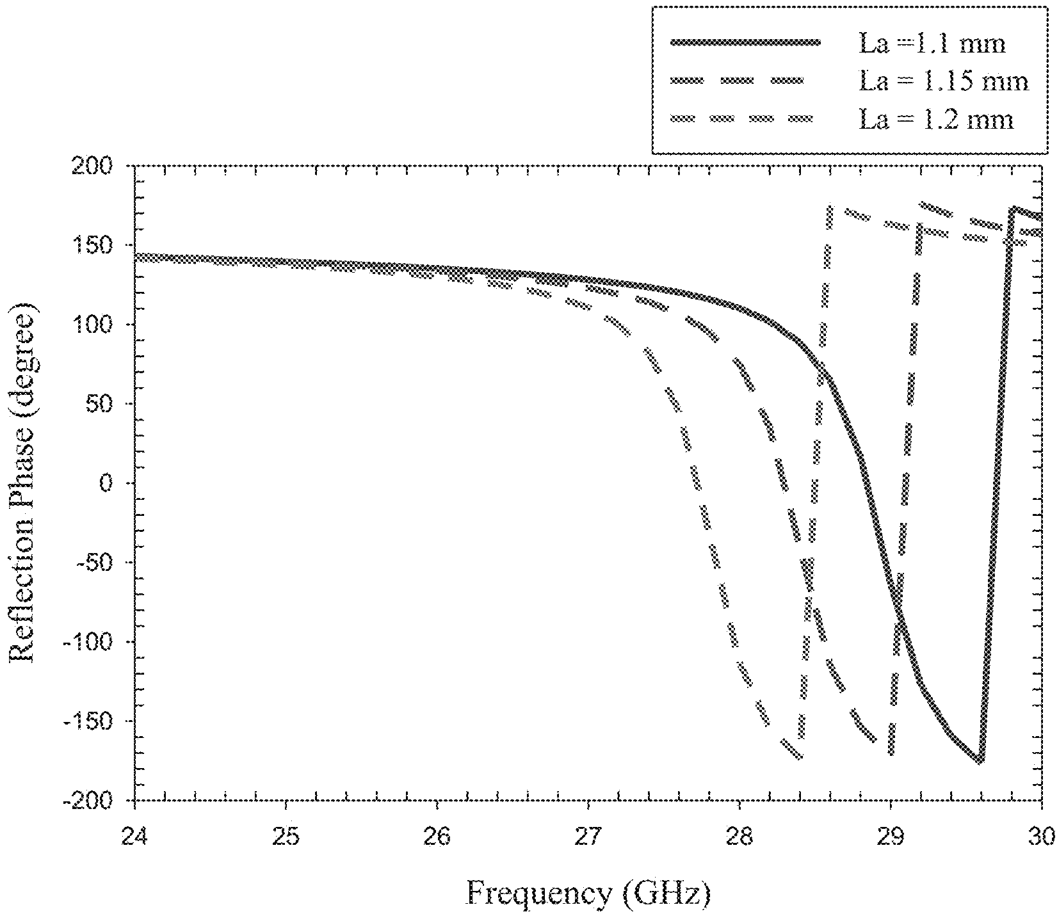
FIGS. 7A, and 7B illustrates mode1 simulation and mode2 simulation, respectively of the first unit cell structure, without mounting a varactor diode, for a plurality of comb arm length variations, in accordance with some embodiments of the present disclosure.
Figure 7B:
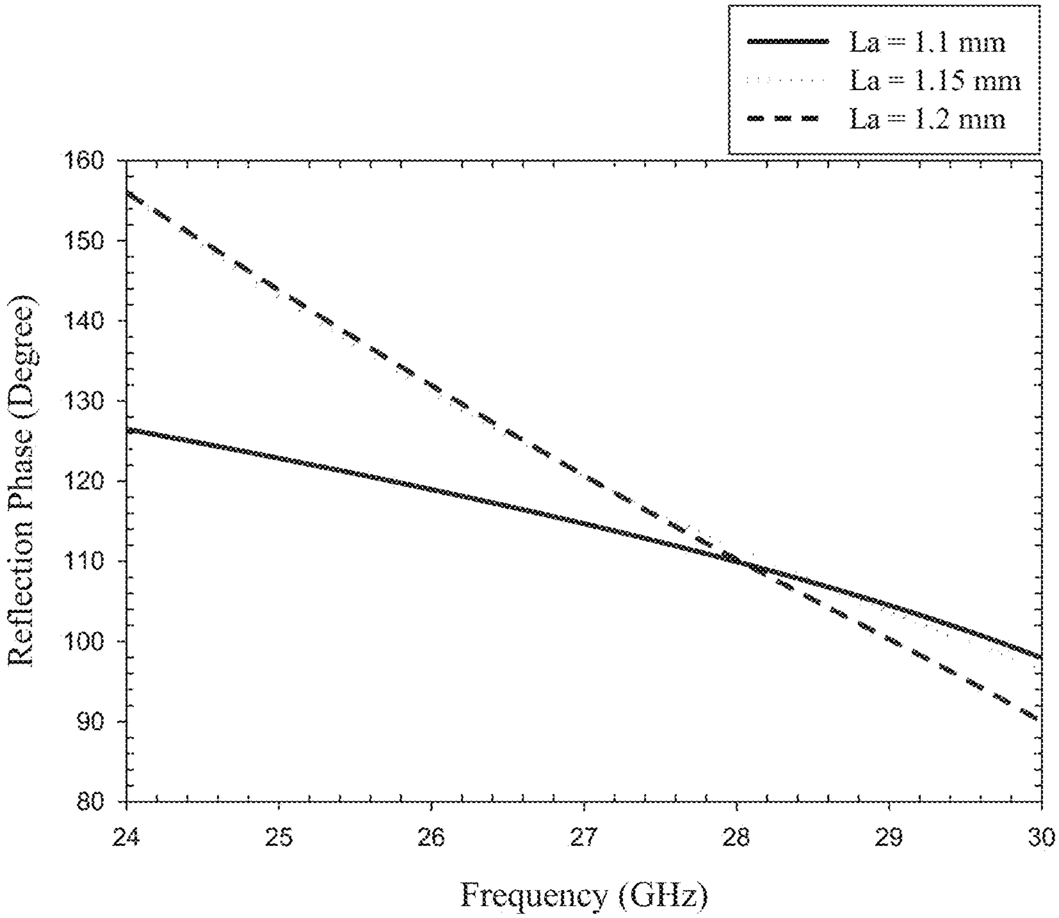

FIGS. 7A, and 7B illustrates mode1 simulation and mode2 simulation, respectively of the first unit cell structure, without mounting the varactor diode, for a plurality of comb arm length variations, in accordance with some embodiments of the present disclosure. More specifically FIGS. 7A, and 7B illustrate a graph plotted for the plurality of frequency variations against the plurality of reflection phase responses for the plurality of comb arm length variations in the mode1 simulation and mode2 simulation. It is observed from FIG. 7A in the graph that as the comb arm length increases the plurality of reflection phase responses versus the frequency of operation curve in the mode1 simulation shifts towards left, that is towards lower frequency. The plurality of reflection phase responses is represented as reflection phase and the frequency of operation is represented as frequency in FIGS. 7A and 7B. Range of the plurality of reflection phase responses that can be attained in the mode1 simulation for a given value of the comb arm length is approximately 330 degrees. However, reflection phase responses change per unit frequency of operation change is high which signifies that the reflectarray metasurface 106 designed with the plurality of parameters will be narrowband in terms of the frequency of operation.

FIG. 7B displays the plurality of reflection phase responses change linearly with the plurality of frequency variations over a smaller phase change of 80 degrees, in the mode2 simulation, for the plurality of comb arm length variations. Therefore, for the plurality of parameters given in the Table 1, mode2 simulation based reflectarray metasurface 106 provides wider bandwidth.

Upon obtaining the plurality of frequency variations of the incident electromagnetic wave, at step 506 of the present disclosure, the one or more hardware processors 108A obtain, an optimum comb arm length among the plurality of comb arm length variations from one of the mode1 simulation and the mode2 simulation, where the reflection phase response of the plurality of reflection phase responses greater than a predefined reflection phase and for a desired frequency of operation of the plurality of frequency variations. The comb arm length 1.15 mm is obtained as the optimum comb arm length among the plurality of comb arm length variations, in accordance with some embodiments of the present disclosure.

At step 508 of the present disclosure, the one or more hardware processors 108A mount, the varactor diode 306 across the predefined gap between the comb-shaped first part 302 and the comb-shaped second part 304.

Upon mounting the varactor diode 306, at step 510 of the present disclosure, the one or more hardware processors 108A obtain, the plurality of reflection phase responses, for each of the plurality of capacitance values of the DC voltage of the varactor diode 306, for the obtained optimum comb arm length and the desired frequency of operation. The first unit cell structure 300 is again simulated with the obtained optimum comb arm length 1.15 mm at the desired frequency of operation 27 GHz, for each of the plurality of capacitance values, by placing the varactor diode 306 at the designated position, in accordance with some embodiments of the present disclosure.

Figure 8A:
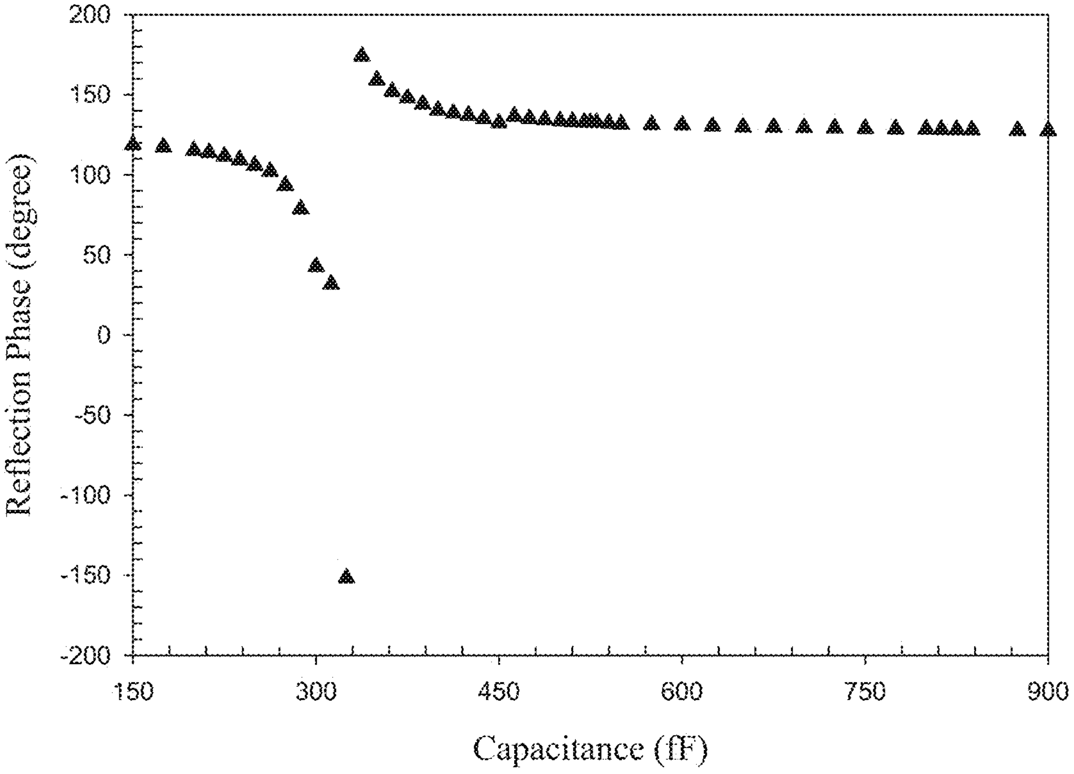
FIGS. 8A, and 8B illustrates mode1 simulation and mode2 simulation, respectively of the first unit cell structure, by mounting the varactor diode, for an obtained optimum comb arm length and a desired frequency of operation, in accordance with some embodiments of the present disclosure.
Figure 8B:
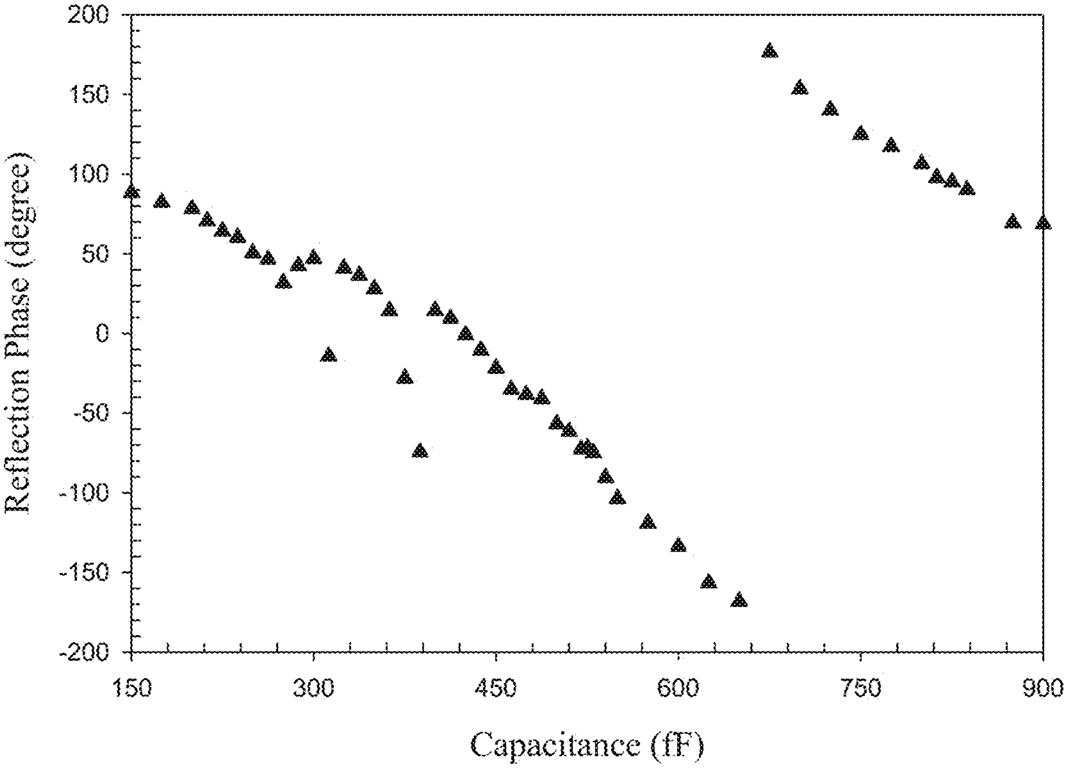

FIGS. 8A, and 8B illustrates mode1 simulation and mode2 simulation, respectively of the first unit cell structure, by mounting a varactor diode 306, for an obtained optimum comb arm length and the desired frequency of operation, in accordance with some embodiments of the present disclosure. More specifically FIGS. 8A and 8B illustrate, the plurality of reflection phase responses for each of the plurality of capacitance values of the DC voltage of the varactor diode 306, for the optimum comb arm length 1.15 mm at the desired frequency of operation 27 GHz, in accordance with some embodiments of the present disclosure. The plurality of reflection phase responses is represented as reflection phase and the plurality of capacitance values is represented as capacity in FIGS. 8A, and 8B.

In FIG. 8A, for the mode1 simulation, it is observed that through the reflection phase changes over a range of approximately 300 degrees. The reflection phase changes from 30 degrees to −160 degrees is effected by only a 10fF capacitance change. Hence due to very high precision requirement on a reverse bias, it is challenging to set the intermediate reflection phase responses.

It is observed in FIG. 8B, under the mode2 simulation covers 360 degrees refection phase responses by selecting suitable capacitance values in the range between 200fF to 900fF. The reflectarray metasurface 106 is build using the plurality of comb-shaped unit cells designed as the first unit cell structure 300 with the optimum comb arm length 1.15 mm, the desired frequency of operation 27 GHz, and the plurality of reflection phase responses obtained form the mode2 simulation, in accordance with some embodiments of the present disclosure.

The steps of the method depicted using flow diagram of FIGS. 5B, and 5C of the present disclosure will now be explained with reference to components of the electronic beam-steering reflectarray antenna system 100 of FIG. 1 and FIG. 4. At step 512 of the present disclosure, the one or more hardware processors 108A set, the plurality of parameters of the second unit cell structure 400 as constant values except comb arm length corresponding to the plurality of first arms, the second top arm 304B, the second bottom arm 304D, and length of the first trunk 302A.

The plurality of parameters of the second unit cell structure 400 are shown in Table 2.

TABLE 2

| Parameter | parameter name | Dimension value (mm) |
|---|---|---|
| Periodicity of the second unit cell | P | 5.3 |
| Width of First trunk and the second trunk | Wt | 0.3 |
| Length of the first trunk | LtA | variable |
| Length of plurality of first arms, second top arm, second bottom arm | La | variable |
| Width of the plurality of first arms and the plurality of second arms | Wa | 0.2 |
| Comb arm span | Ls | 2 |
| Gap between Comb-shaped First part and Comb-shaped second part | G | 0.4 |
| Pad for shorting cylindrical metal post | pad | 0.6 |
| Diameter of shorting cylindrical metal post | — | 0.5 |
| Hole diameter in Copper Bottom Layer Reflector | — | 1 |
| first dielectric substrate thickness | t | 0.787 |

TABLE 2-continued

| Parameter | parameter name | Dimension value (mm) |
|---|---|---|
| first dielectric substrate constant | $\varepsilon_r$ | 2.2 |
| Second dielectric Substrate thickness | t | 0.787 |
| Second dielectric Substrate constant | $\varepsilon_r$ | 2.2 |

Figure 9A:
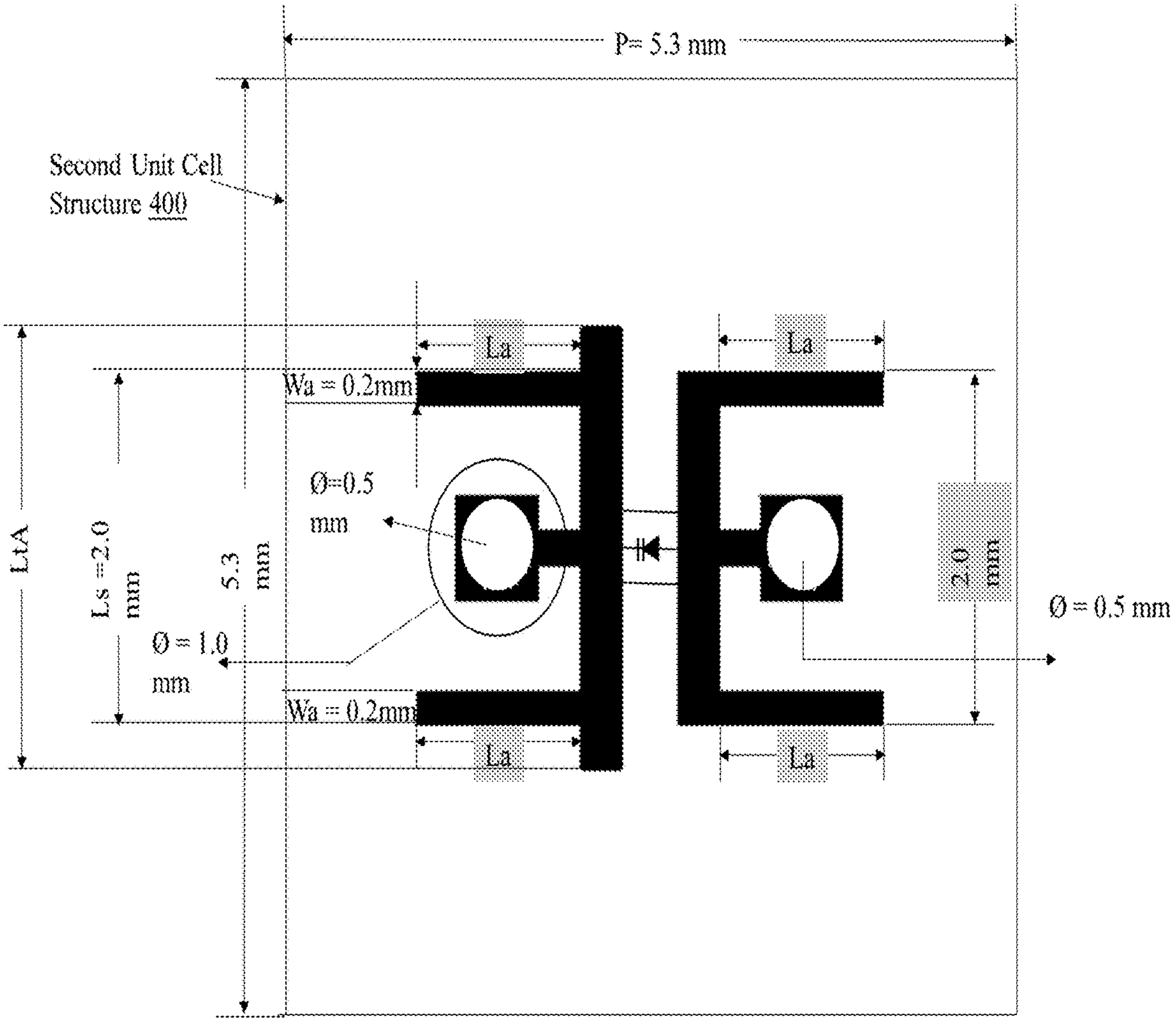
FIGS. 9A, and 9B illustrates an exemplary representation (not to scale) of a top view and a side view, respectively of the second unit cell structure of the electronic beam-steering reflectarray antenna system with varactor diode embedded comb-shaped unit cell, in accordance with some embodiments of the present disclosure.
Figure 9B:
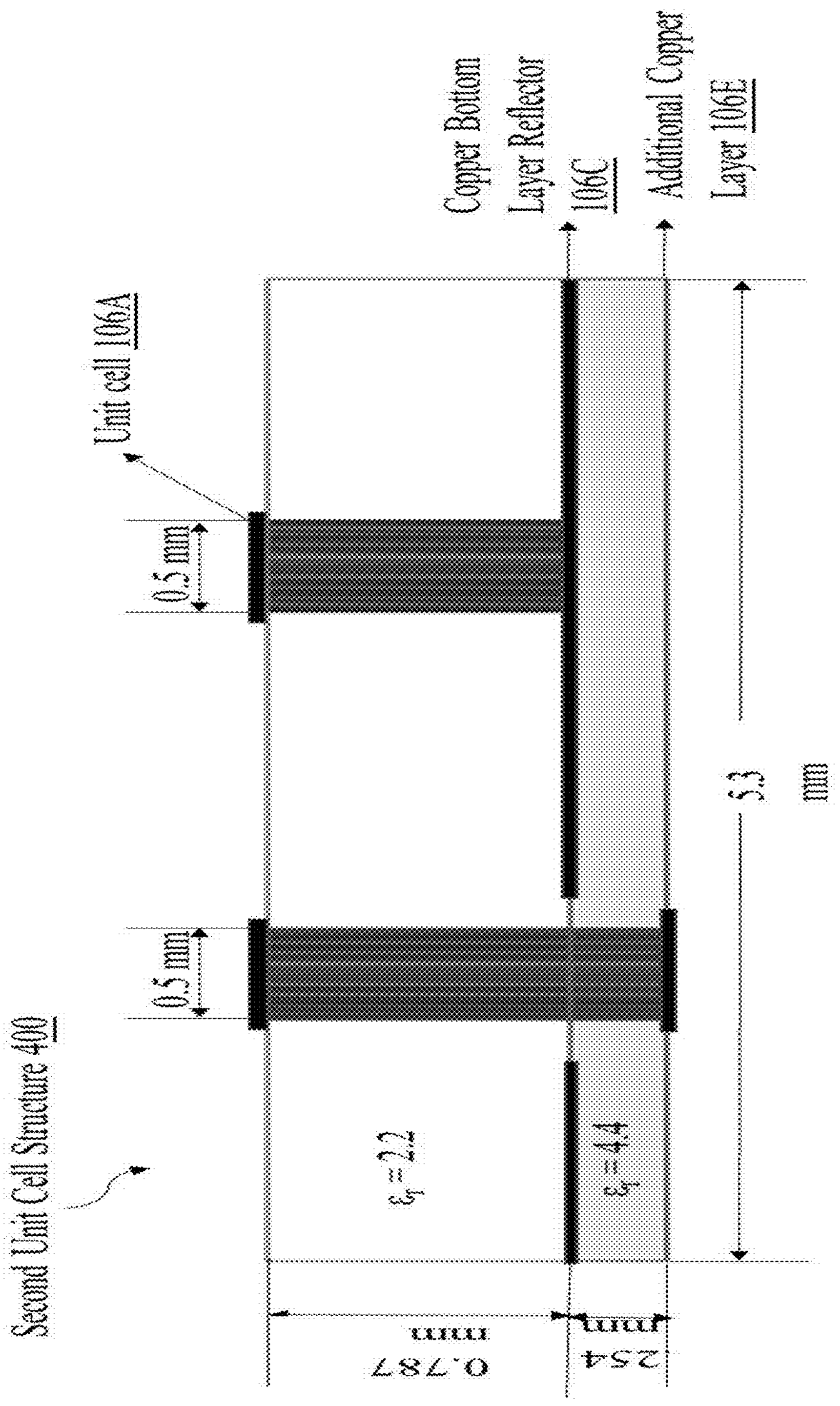

FIGS. 9A, and 9B illustrates an exemplary representation of a top view and a side view, respectively of the second unit cell structure of the electronic beam-steering reflectarray antenna system with varactor diode embedded comb-shaped unit cell, in accordance with some embodiments of the present disclosure. More specifically dimension values of the top view and the side view, respectively of the second unit cell structure 400 are represented in FIGS. 9A and 9B, in accordance with some embodiments of the present disclosure.

Upon setting the plurality of parameters of the second unit cell structure 400, at step 514 of the present disclosure, the one or more hardware processors 108A obtain, the plurality of frequency variations of the incident electromagnetic wave and the corresponding plurality of reflection phase responses of the reflected beam, without mounting the varactor diode 306 on the second unit cell structure 400, for the plurality of comb arm length variations. The comb arm length varies between the first value and the second value by steps of the predefined value. Initially length of the first trunk 302A is initialized with length of the comb-shaped unit cell. A standard Floquet port analysis is conducted for the second unit cell structure 400 where the comb arm length is varied from 0.5 mm to 1.5 mm in steps of 0.05 mm, in accordance with some embodiments of the present disclosure. Further the mode1 simulation and the mode2 simulation is performed for each of the plurality of comb arm length variations, and a plurality of comb trunk length variations.

Figure 10A:
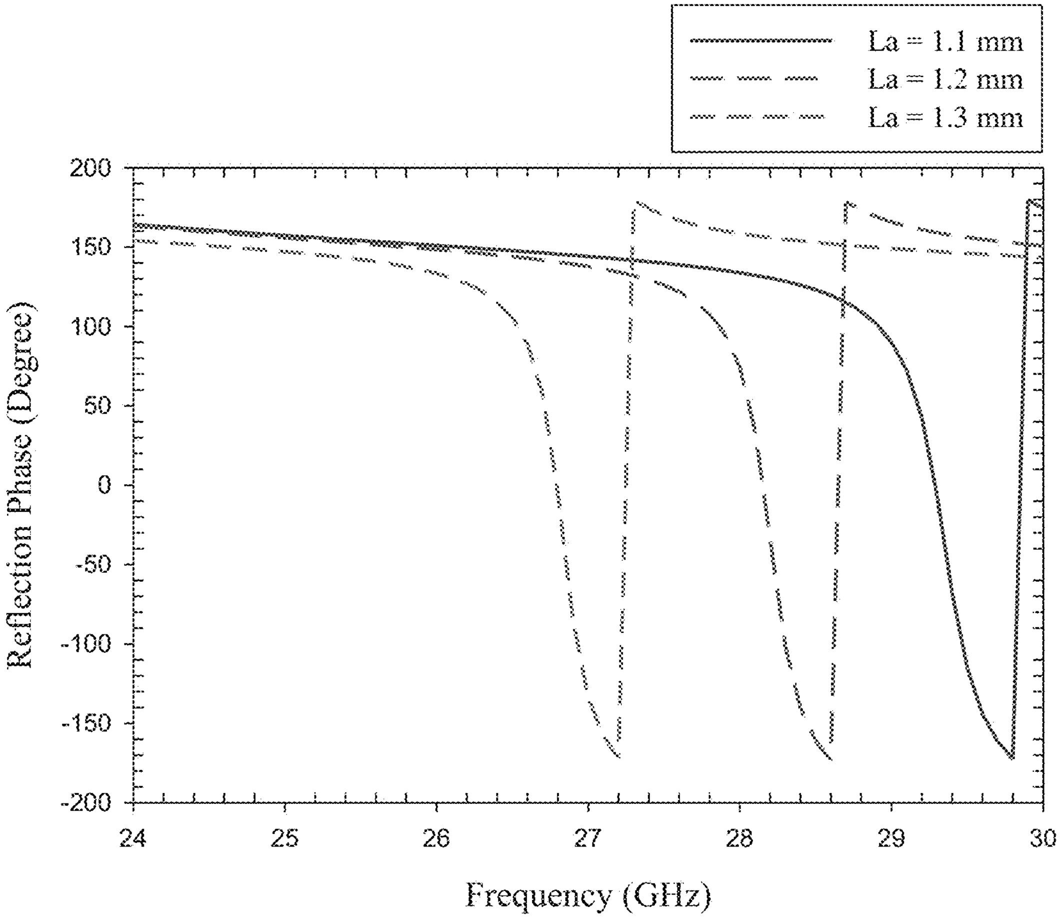
FIGS. 10A, and 10B illustrates mode1 simulation and mode2 simulation, respectively of the second unit cell structure, without mounting the varactor diode, for the plurality of comb arm length variations, in accordance with some embodiments of the present disclosure.
Figure 10B:
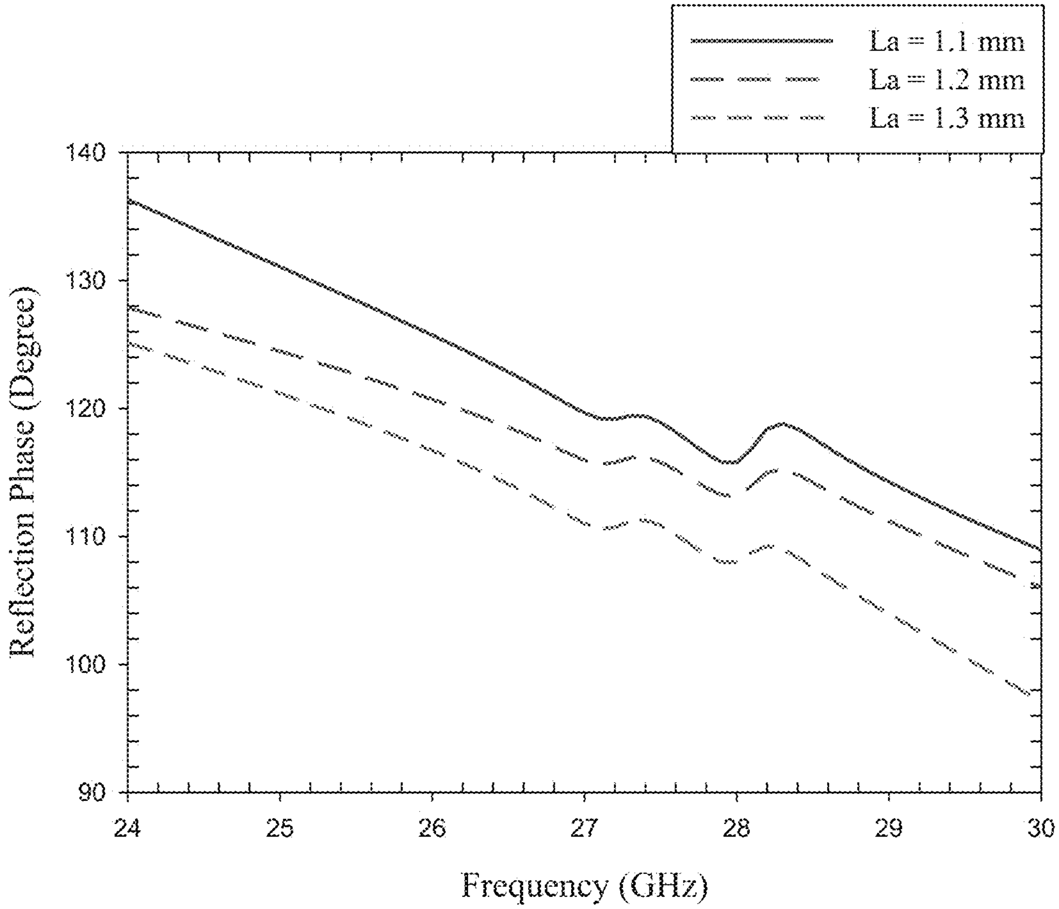

FIGS. 10A, and 10B illustrates mode1 simulation and mode2 simulation, respectively of the second unit cell structure 400, without mounting the varactor diode, for the plurality of comb arm length variations, in accordance with some embodiments of the present disclosure. More specifically FIGS. 10A and 10B illustrate a graph plotted for the plurality of frequency variations against the plurality of reflection phase responses for the plurality of comb arm length variations in the mode1 simulation and mode2 simulation. FIGS. 10A, and 10B display results for the mode1 simulation and the mode2 simulation, where the length of the first trunk 302A is kept fixed, and the comb arm length is varied from 0.5 mm to 1.5 mm in steps of 0.05 mm. The plurality of reflection phase responses is represented as the reflection phase and the frequency of operation is represented as the frequency in FIGS. 10A and 10B.

At step 516 of the present disclosure, the one or more hardware processors 108A obtain, the optimum comb arm length among the plurality of comb arm length variations from one of the mode1 simulation and the mode2 simulation, where the reflection phase response of the plurality of reflection phase responses greater than the predefined reflection phase and for the desired frequency of operation of the plurality of frequency variations. The comb arm length 1.2 mm is obtained as the optimum comb arm length among the plurality of comb arm length variations, in accordance with some embodiments of the present disclosure.

At step 518 of the present disclosure, the one or more hardware processors 108A obtain, the plurality of frequency variations of the incident electromagnetic wave and the corresponding plurality of reflection phase responses of the reflected beam, without mounting the varactor diode 306 on the second unit cell structure 400, for the plurality of comb trunk length variations, wherein the comb trunk length varies between a first trunk length value and a second trunk length value by steps of the predefined value. The comb arm length here is set to the optimum comb arm length, in accordance with some embodiments of the present disclosure.

At step 520 of the present disclosure, the one or more hardware processors 108A obtain, the optimum comb trunk length among the plurality of comb trunk length variations from one of the mode1 simulation and the mode2 simulation, where the reflection phase response of the plurality of reflection phase responses greater than the predefined reflection phase for the desired frequency of operation of the plurality of frequency variations.

At step 522 of the present disclosure, the one or more hardware processors 108A mount, the varactor diode 306 across the predefined gap between the comb-shaped first part 402 and the comb-shaped second part 404.

At step 524 of the present disclosure, the one or more hardware processors 108A obtain, the plurality of reflection phase responses, for each of the plurality of capacitance values of the DC voltage of the varactor diode, for the obtained optimum comb arm length, the optimum comb trunk length, and the desired frequency of operation. The second unit cell structure 400 is again simulated with the obtained optimum comb arm length 1.2 mm, the optimum comb trunk length 3 mm at the desired frequency of operation 27 GHz, for each of the plurality of capacitance values, by placing the varactor diode 306 at the designated position, in accordance with some embodiments of the present disclosure. The reflectarray metasurface 106 is build using the plurality of comb-shaped unit cells designed as the second unit cell structure 400 with the optimum comb arm length 1.2 mm, the optimum comb trunk length 3 mm, the desired frequency of operation 27 GHz, and the plurality of reflection phase responses obtained form the mode1 simulation, in accordance with some embodiments of the present disclosure.

Figure 11:
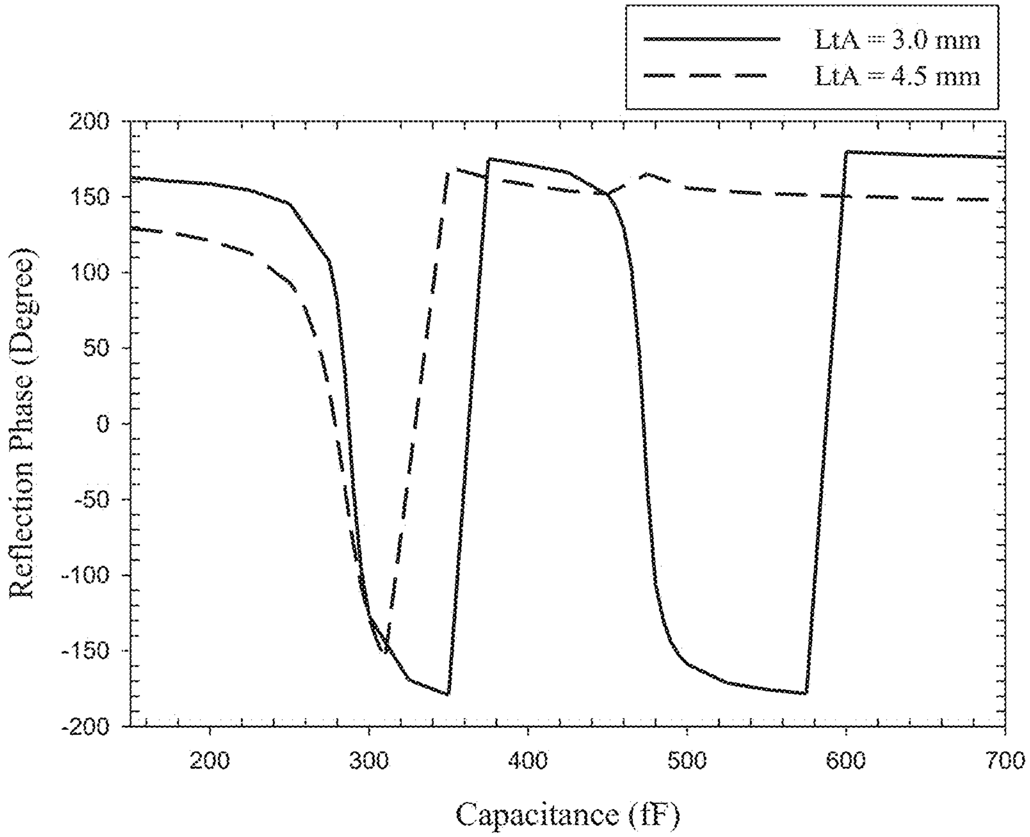
FIG. 11 illustrates a mode1 simulation of the second unit cell structure, by mounting the varactor diode, for the optimum comb arm length and the optimum comb trunk length, the desired frequency of operation, in accordance with some embodiments of the present disclosure.

FIG. 11 illustrates a mode1 simulation of the second unit cell structure, by mounting the varactor diode 306, for the optimum comb arm length and the optimum comb trunk length, the desired frequency of operation, in accordance with some embodiments of the present disclosure. The plurality of reflection phase responses is represented as reflection phase and the plurality of capacitance values is represented as capacity in FIG. 11.

It is observed in the mode1 simulation for the optimum comb arm length 3 mm, the reflection phase undergoes approximately 330 degrees twice in selected capacity range between 200fF to 900fF. This signifies that any specific reflection phase response corresponds to two possible capacitance values which in turn relates to two DC bias options.

Further the reflection phase gradient of the reflectarray meta surface 106 is obtained from the plurality reflection phase responses corresponding to each of the plurality of comb-shaped unit cells 106A, designed as one of the first unit cell structure 300 and the second unit cell structure 400, for a desired angle received from a user. The capacitance values of the plurality of capacitance values obtained for each of the plurality of comb-shaped unit cells 106A, from the reflection phase gradient. The obtained plurality of capacitance values is mapped to the DC bias voltages corresponding to the varactor diodes 306 using a predefined lookup table. Suitable DC bias voltage is applied to the varactor diode in each of the plurality of comb-shaped unit cells 106A, to tilt the reflected beam over the desired direction.

Figure 12A:
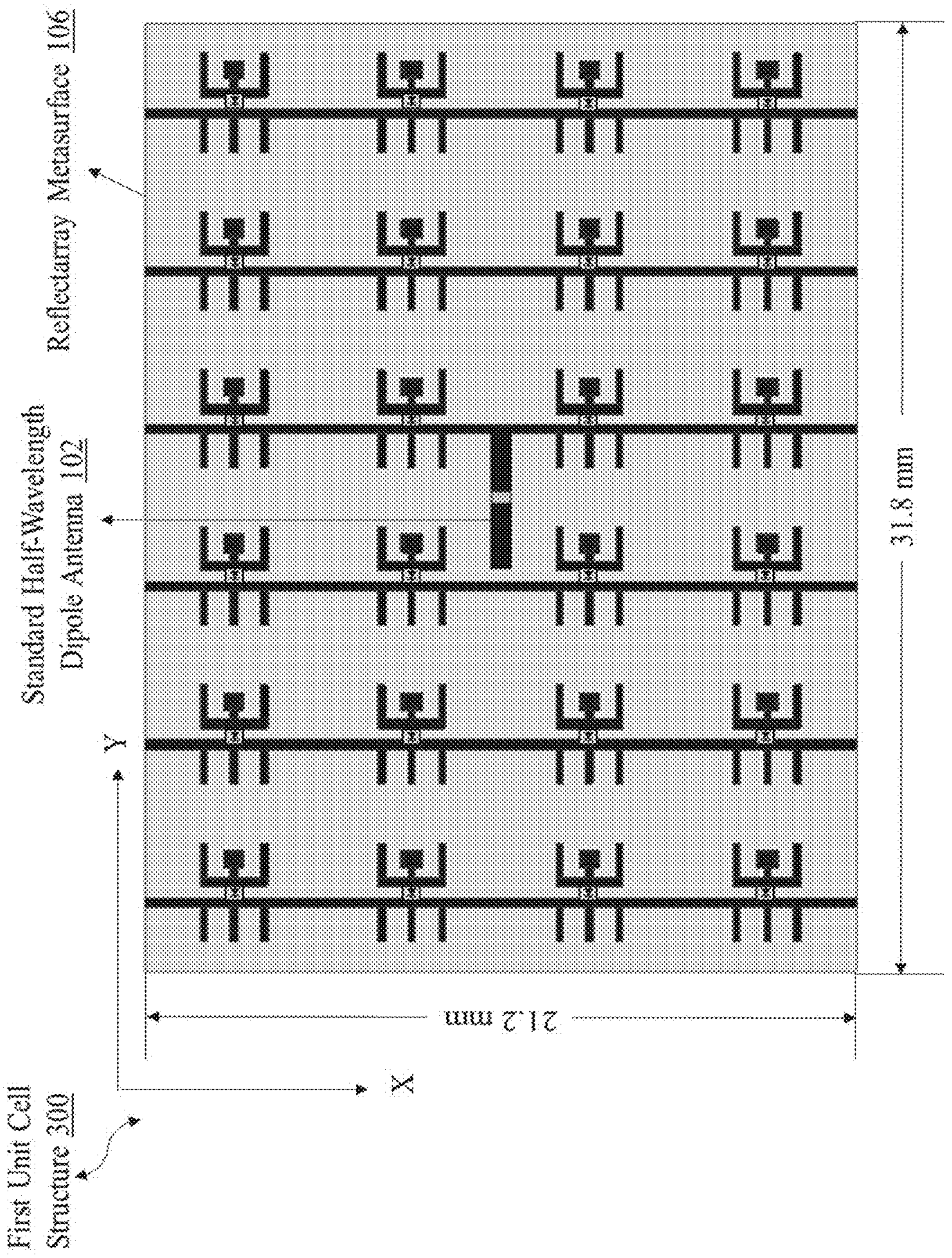
FIGS. 12A, 12B, and 12C illustrates an exemplary representation (not to scale) of a top view, a side view, and a front view respectively of the reflectarray metasurface comprising the plurality of comb-shaped unit cells of the first unit cell structure, in accordance with some embodiments of the present disclosure.
Figure 12B:
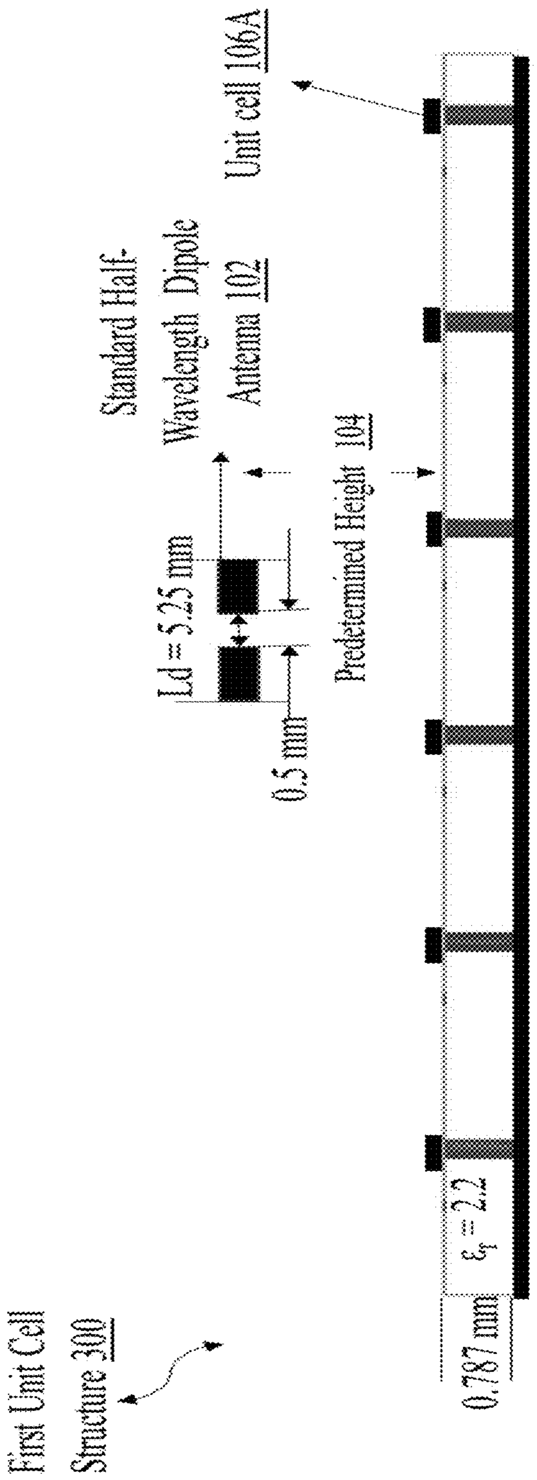
Figure 12C:
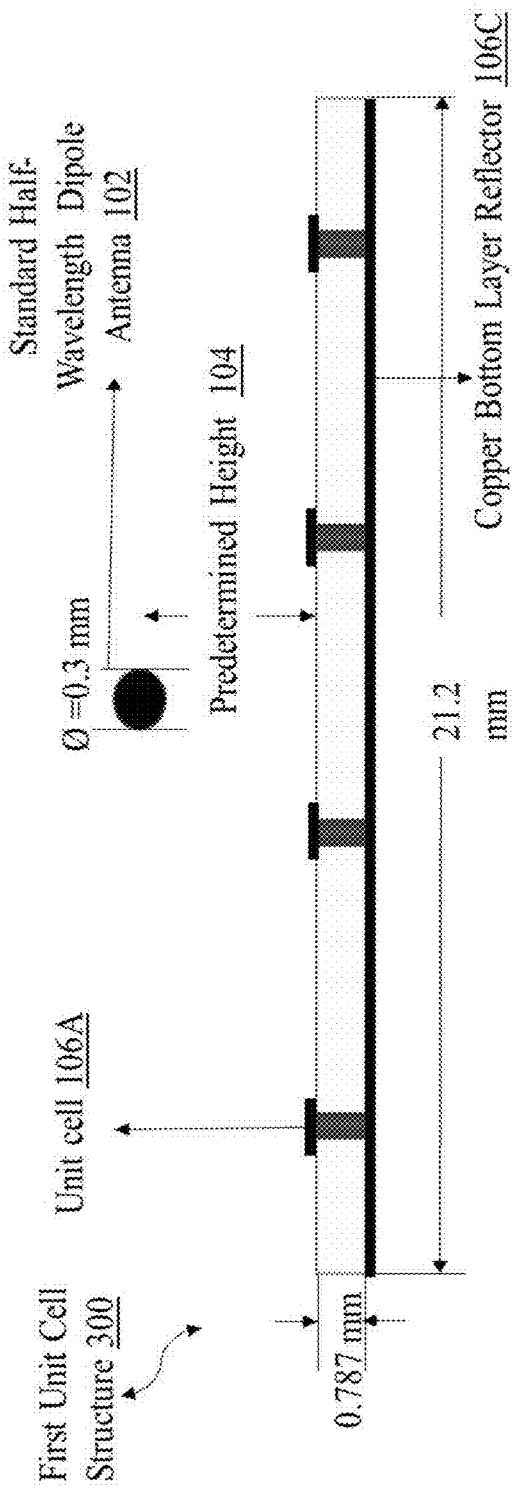

FIGS. 12A, 12B, and 12C illustrates an exemplary representation of a top view and a side view, and a front view respectively of the reflectarray metasurface 106 comprising the plurality of comb-shaped unit cells of the first unit cell structure 300, in accordance with some embodiments of the present disclosure. Each of the plurality of comb-shaped unit cells 106A are mounted with the varactor diode 306 with a predefined capacitance value. The standard half-wavelength dipole antenna 102 is placed at the predetermined height 104 above the refelctarray metasurface 106. Dipole arms of the standard half-wavelength dipole antenna 102 are oriented accordingly to the mode2 simulation. Specifically FIG. 12A illustrates an exemplary representation of the plurality of comb-shaped unit cells 106A arranged as the matrix of 6 columns and 4 rows over the reflectarray metasurface 106. The plurality of the comb-shaped unit cells 106A in each of the column have same capacitance values. This is due to the reason reverse bias to the varactor diode 306 are fed through the first trunk 302A which is common for all the plurality of comb-shaped unit cells 106A in each of the column. To evaluate the beam steering, different capacitance values are fed across the 6 columns resulting in a reflection phase gradient towards the +Y axis. The first row in Table 3 represents the different capacitance values fed across the 6 columns and the second row of the Table 3 depicts the corresponding reflection phase responses.

TABLE 3

| Capacitor (fF) | 700 | 760 | 801 | 873 | 253 | 355 |
|---|---|---|---|---|---|---|
| Reflection Phase (deg) | 153.57 | 127.58 | 102.94 | 77.18 | 50.67 | 24.52 |

From Table. 3 it is observed that there is an average reflection phase gradient of −25.8° between the two consecutive columns is towards +Y axis. By applying Snells law, a theoretical beam-steering angle of 8.64° obtained from normal towards +Y axis.

Figure 13A:
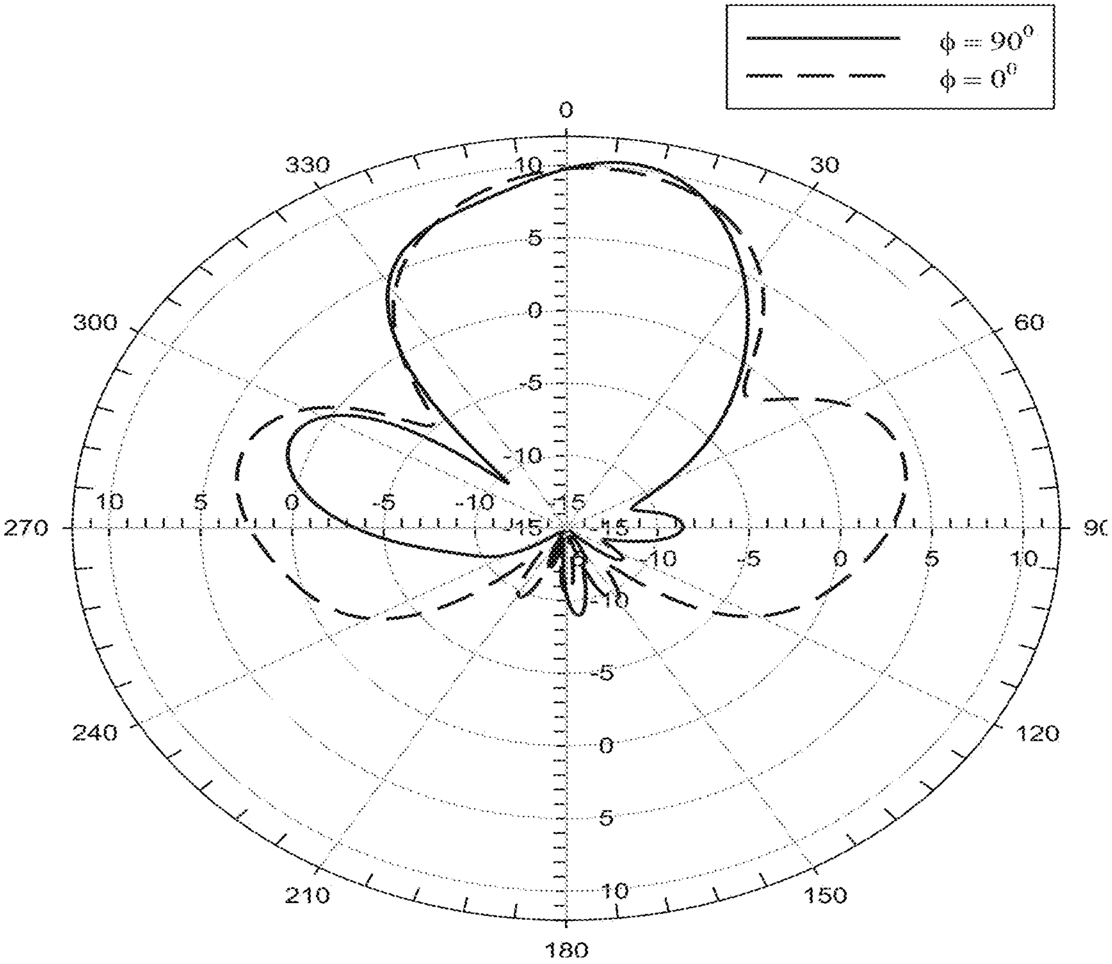
FIGS. 13A, and 13B illustrates an exemplary representation of radiation gain pattern corresponding to beam steering of the reflectarray metasurface created by using the plurality of comb-shaped unit cells of the first unit cell structure, in accordance with some embodiments of the present disclosure.
Figure 13B:
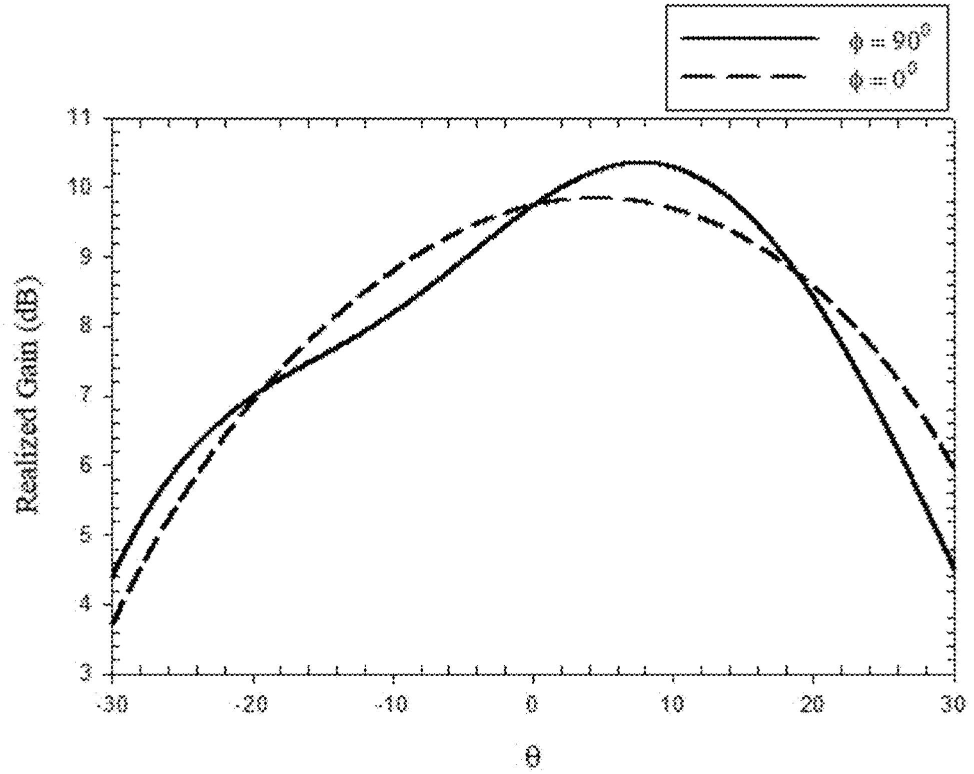

FIGS. 13A, and 13B illustrates an exemplary representation of radiation gain pattern corresponding to the beam steering of the reflectarray metasurface created by using the plurality of comb-shaped unit cells 106A of first unit cell structure 300, in accordance with some embodiments of the present disclosure. More specifically FIG. 13A represents the radiation gain pattern for X-Z plane and Y-Z plane, for the standard half-wavelength dipole antenna 102 placed at an height 6 mm above the reflectarray metasurface. $\phi$=0° is an elevation pattern of the refelctarray metasurface in the X-Z plane and $\phi$=90° is the elevation pattern in Y-Z plane. It is observed from the FIG. 13B that the reflected beam is steered in the Y-Z plane by 7.7° at f=27 GHz which is close to the theoretical estimate of 8.6°, for the standard half-wavelength dipole antenna 102 placed at the predetermined height 6 mm above the reflectarray metasurface 106.

Table. 4 illustrates beam tilt angles for different heights of the standard half-wavelength dipole antenna 102 over the reflectarray metasurface 106.

TABLE 4

| Height of Dipole above reflectarray (mm) | Beam Tilt Angle (deg) |
|---|---|
| 5.9 | −15.8 |
| 6 | 7.7 |
| 6.1 | −0.2 |
| 6.2 | 3.1 |
| 6.4 | 3.1 |
| 6.5 | 10.6 |
| 6.9 | 11.3 |
| 7 | 6.7 |
| 7.1 | 12.7 |
| 7.2 | 13.1 |

Further the beam tilt angle is evaluated against the frequency of operation, where the frequency of operation while design is done at a single frequency f=27 GHz. Table. 5 represents the beam tilt angle for different

TABLE 5

| Frequency (GHz) | Beam Tilt Angle (deg) |
|---|---|
| 26.6 | 2.4 |
| 26.7 | 5.7 |
| 26.8 | 8.1 |
| 26.9 | 8.6 |
| 27.0 | 7.7 |
| 27.1 | 7.5 |
| 27.2 | 8.6 |
| 27.3 | 10.1 |
| 27.4 | 11.8 |

From Table. 5, it is observed that the beam-steering angle is stable between 7.5° and 8.6° for the frequency of the operation between 26.8 GHz and 27.2 GHz.

Figure 14A:
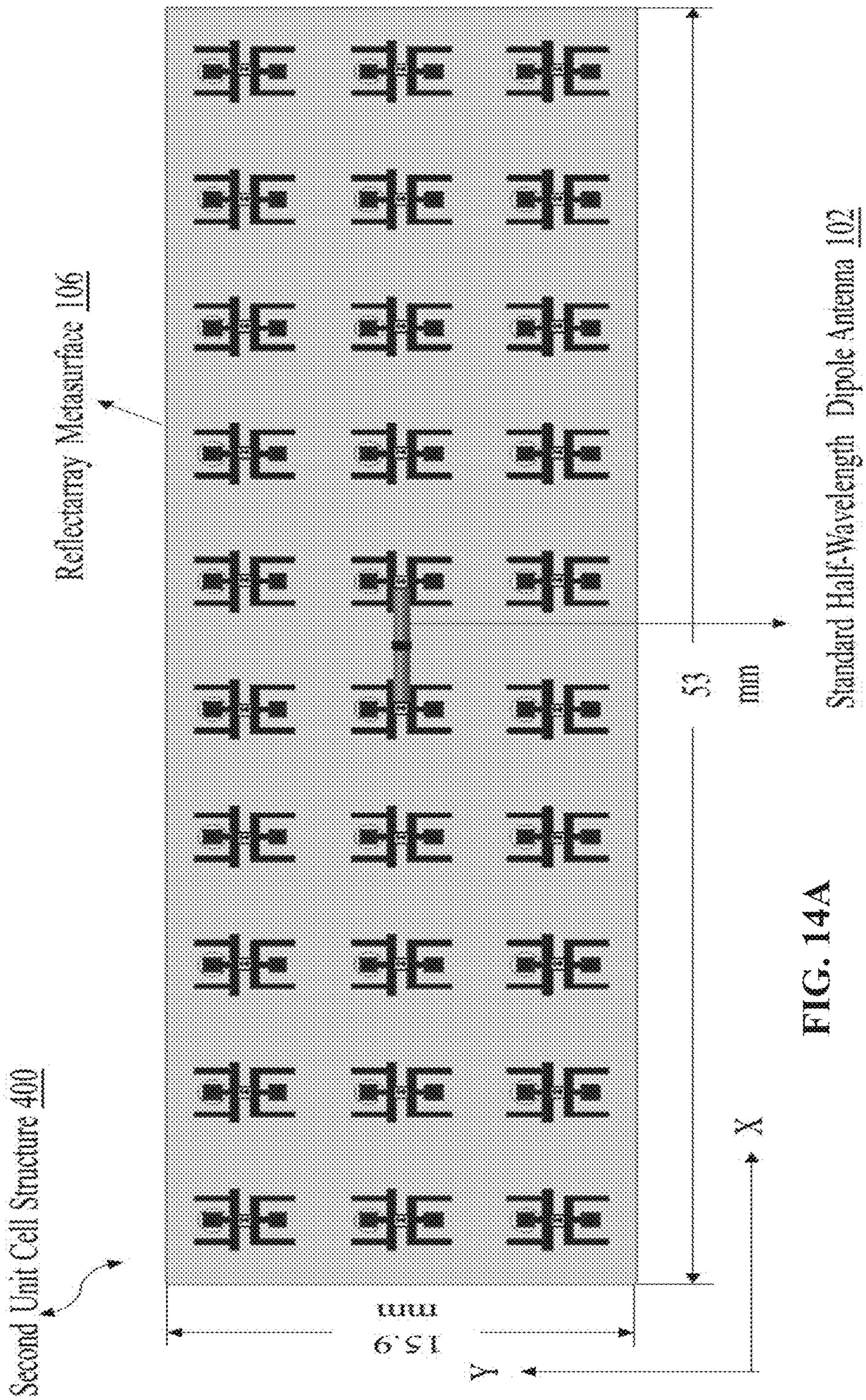
FIGS. 14A, 14B, and 14C illustrates an exemplary representation (not to scale) of a top view and a side view, and a front view respectively of the reflectarray metasurface comprising the plurality of comb-shaped unit cells of the second unit cell structure, in accordance with some embodiments of the present disclosure.
Figure 14B:
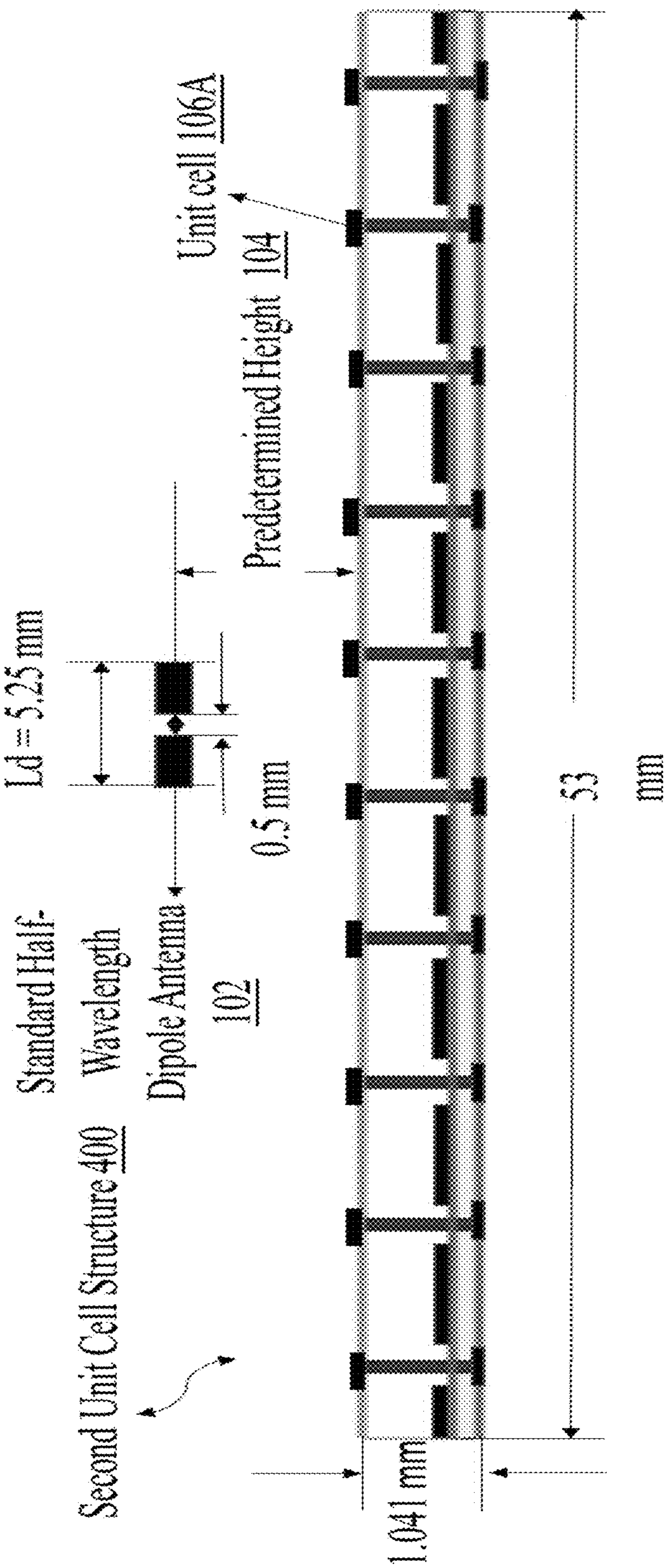
Figure 14C:
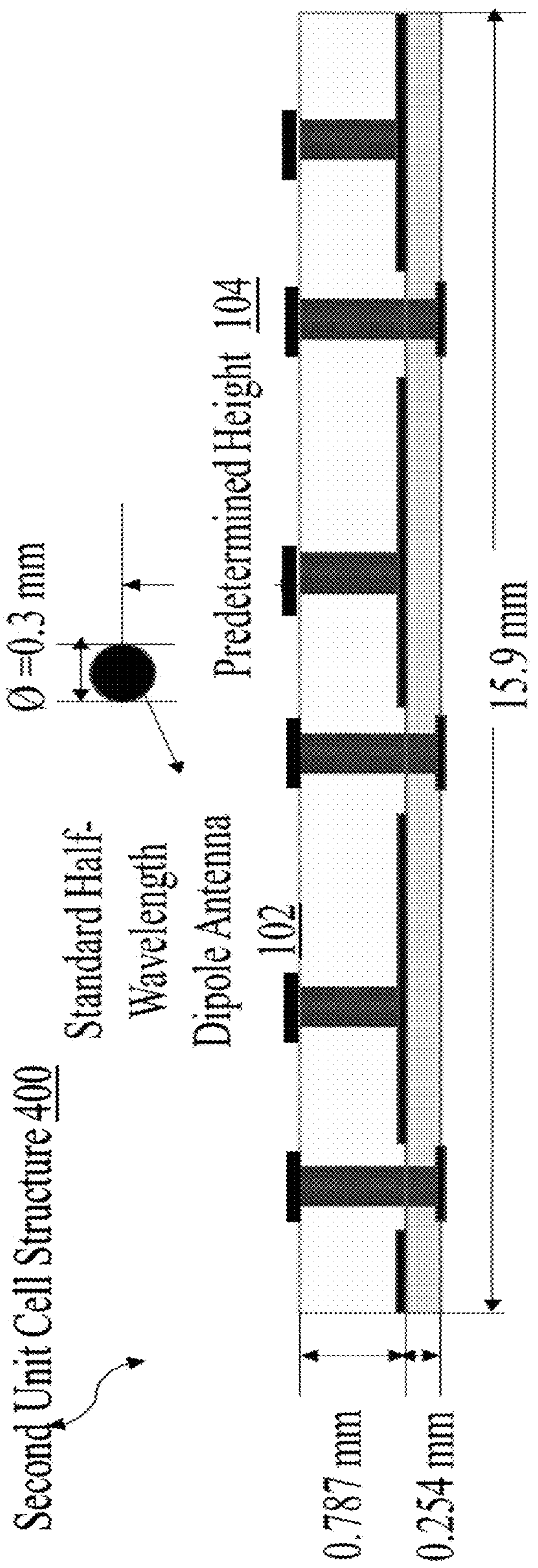

FIGS. 14A, 14B, and 14C illustrates an exemplary representation of a top view and a side view, and a front view respectively of the reflectarray metasurface 106 comprising a plurality of comb-shaped unit cells of the second unit cell structure, in accordance with some embodiments of the present disclosure. Each of the plurality of comb-shaped unit cells are mounted with the varactor diode 306 with the predefined capacitance value. The standard half-wavelength dipole antenna 102 is placed at the predetermined height above the refelctarray metasurface 106 is used to excite the the refelctarray metasurface 106. The dipole arms of the standard half-wavelength dipole antenna are oriented accordingly to the model simulation. Specifically FIG. 14A illustrates an exemplary representation of the plurality of comb-shaped unit cells 106A arranged as a matrix of 10 columns along X-axis and 3 rows along Y-axis over the reflectarray metasurface. It is assumed that the plurality of comb-shaped unit cells 106A for each of the column have identical capacitance values whereas the plurality of comb-shaped unit cells 106A across the columns have the phase gradient. Thus the beam-steering will take place only in the X-Z plane. For evaluating the beam steering, different capacitance values are fed across the 10 columns resulting in the reflection reflection phase gradient towards +X axis, shown in Table. 6.

The first column in the table. 6 represents the different capacitance values fed across the 10 columns and the corresponding reflection phase responses.

TABLE 6

| Capacitor (fF) | Reflection phase (deg) |
|---|---|
| 150 | 162.77 |
| 252 | 142.84 |
| 269 | 123.01 |
| 276 | 103.04 |
| 280 | 81.23 |
| 282 | 65.55 |
| 284 | 34.37 |
| 286 | 17.12 |
| 286 | 3.56 |
| 289 | −30.71 |

From Table. 6 it is observed that the average reflection phase gradient of −21.50 towards +X-axis corresponding to 7.20 beam tilt is towards +X axis.

Figure 15A:
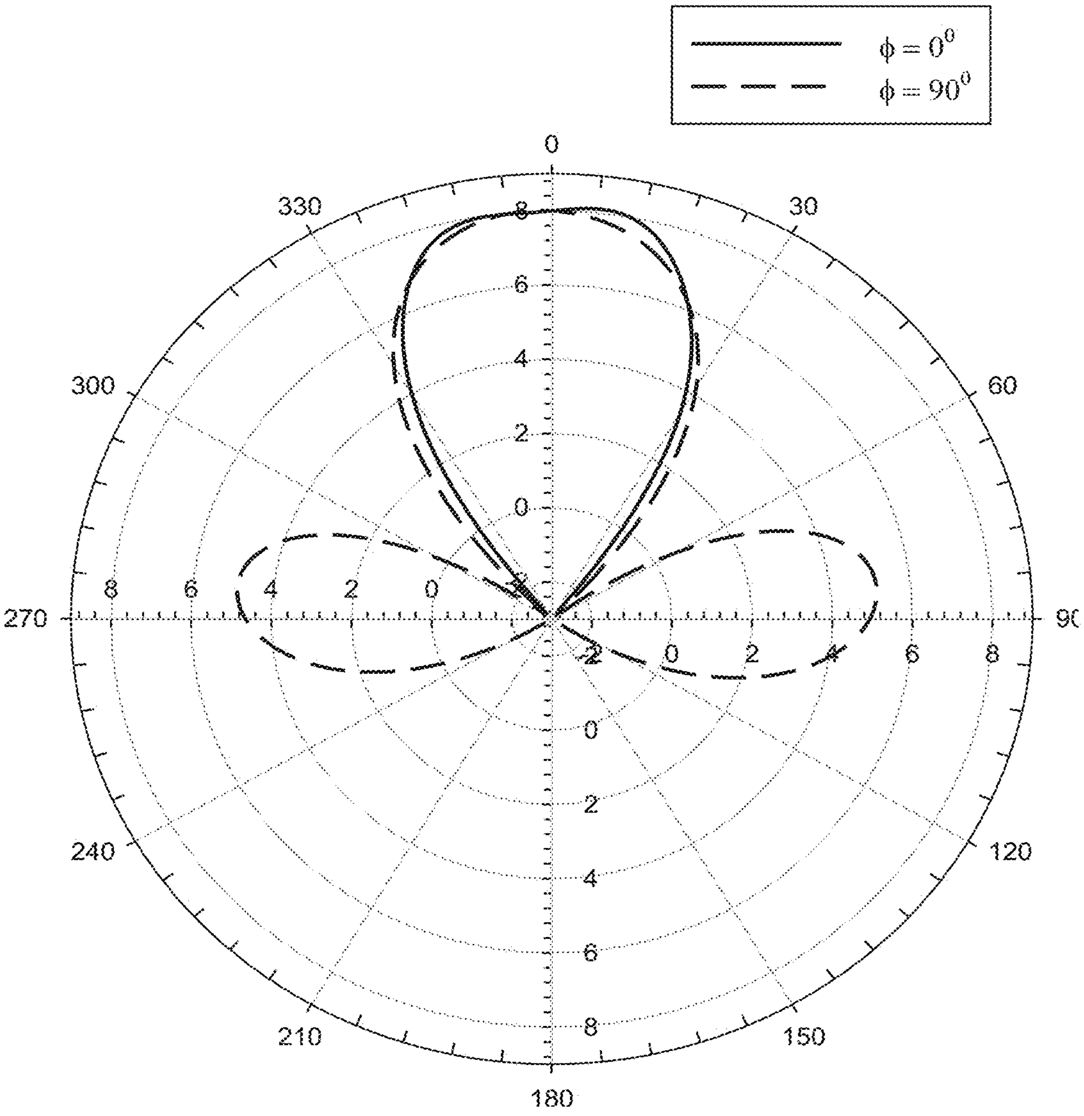
FIGS. 15A, and 15B illustrates an exemplary representation of radiation gain pattern corresponding to the beam steering of the reflectarray metasurface created by using the plurality of comb-shaped unit cells of second unit cell structure, in accordance with some embodiments of the present disclosure.
Figure 15B:
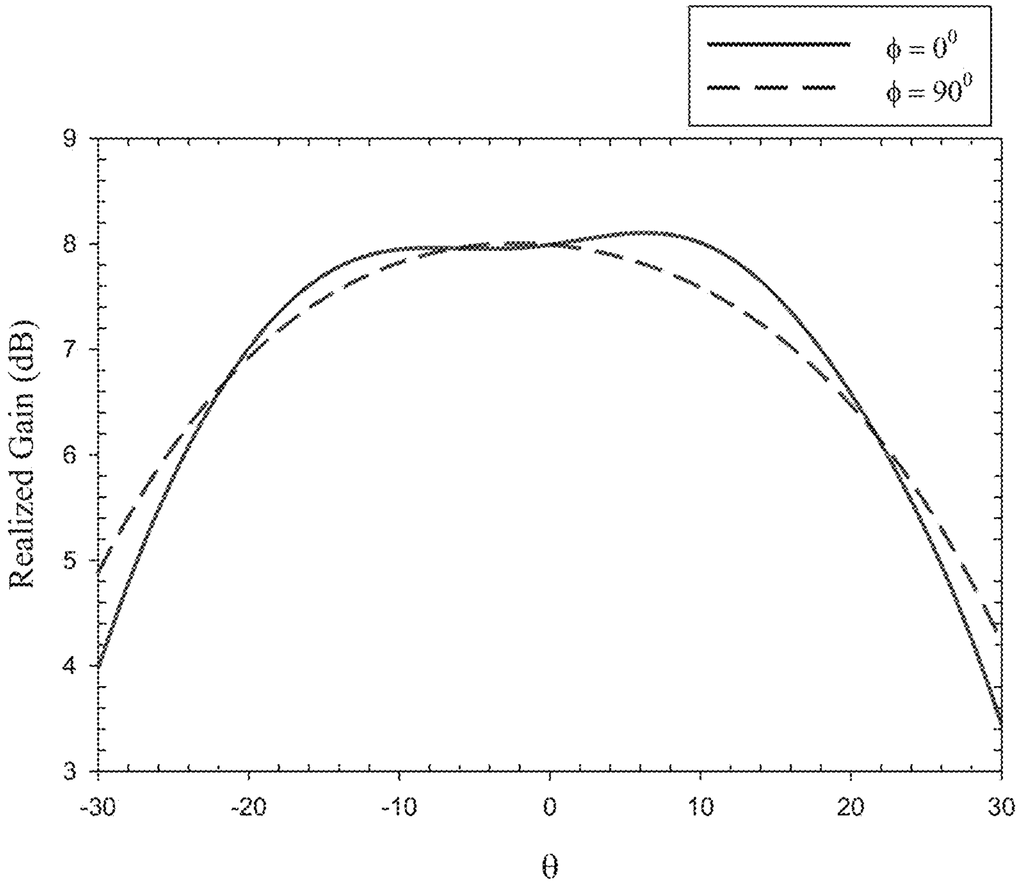

FIGS. 15A, and 15B illustrates an exemplary representation (not to scale) of radiation gain pattern corresponding to the beam steering of the reflectarray metasurface created by using plurality of comb-shaped unit cells of second unit cell structure 400, in accordance with some embodiments of the present disclosure, in accordance with some embodiments of the present disclosure. More specifically FIG. 15A represents the radiation gain pattern for X-Z plane and Y-Z plane, for the standard half-wavelength dipole antenna 102 placed at the height 7.9 mm above the reflectarray metasurface. $\phi=0°$ is an elevation pattern of the refelctarray metasurface in the X-Z plane and $\phi=90°$ is the elevation pattern in Y-Z plane.

It is observed from the FIG. 15B that the reflected beam is steered in the Y-Z plane by 6.3° at f=27 GHz, which is close to the theoretical estimate of 7.2° for the standard half-wavelength dipole antenna 102 placed at the predetermined height 7.9 mm above the reflectarray metasurface 106.

Table 7. illustrates beam tilt angles for different heights of the standard half-wavelength dipole antenna 102 over the reflectarray metasurface 106.

TABLE 7

| Height of Dipole above reflectarray (mm) | Beam Tilt Angle (deg) |
|---|---|
| 7 | −1.1 |
| 7.5 | −0.6 |
| 7.7 | 4 |
| 7.8 | −5.9 |
| 7.9 | 6.3 |
| 8 | 5.8 |
| 8.1 | 12 |
| 8.2 | 6 |
| 8.3 | −13.4 |

Further the beam tilt angle is evaluated against the frequency of operation, where the frequency of operation while design is done at a single frequency f=27 GHz. Table 8 represents the beam tilt angle for different frequencies.

TABLE 8

| Frequency (GHz) | Beam Tilt Angle (deg) |
|---|---|
| 26.6 | −8.5 |
| 26.7 | −8 |
| 26.8 | 5.9 |
| 26.9 | 6.1 |
| 27.0 | +6.3 |
| 27.1 | +6.5 |
| 27.15 | +6.7 |
| 27.2 | +7.7 |
| 27.3 | +7.8 |
| 27.4 | −1.2 |

From Table. 8 it is observed that the beam tilt angle is stable between 6.3° to 7.8° for the frequency range between 27 GHz and 27.3 GHz.

Figure 16A:
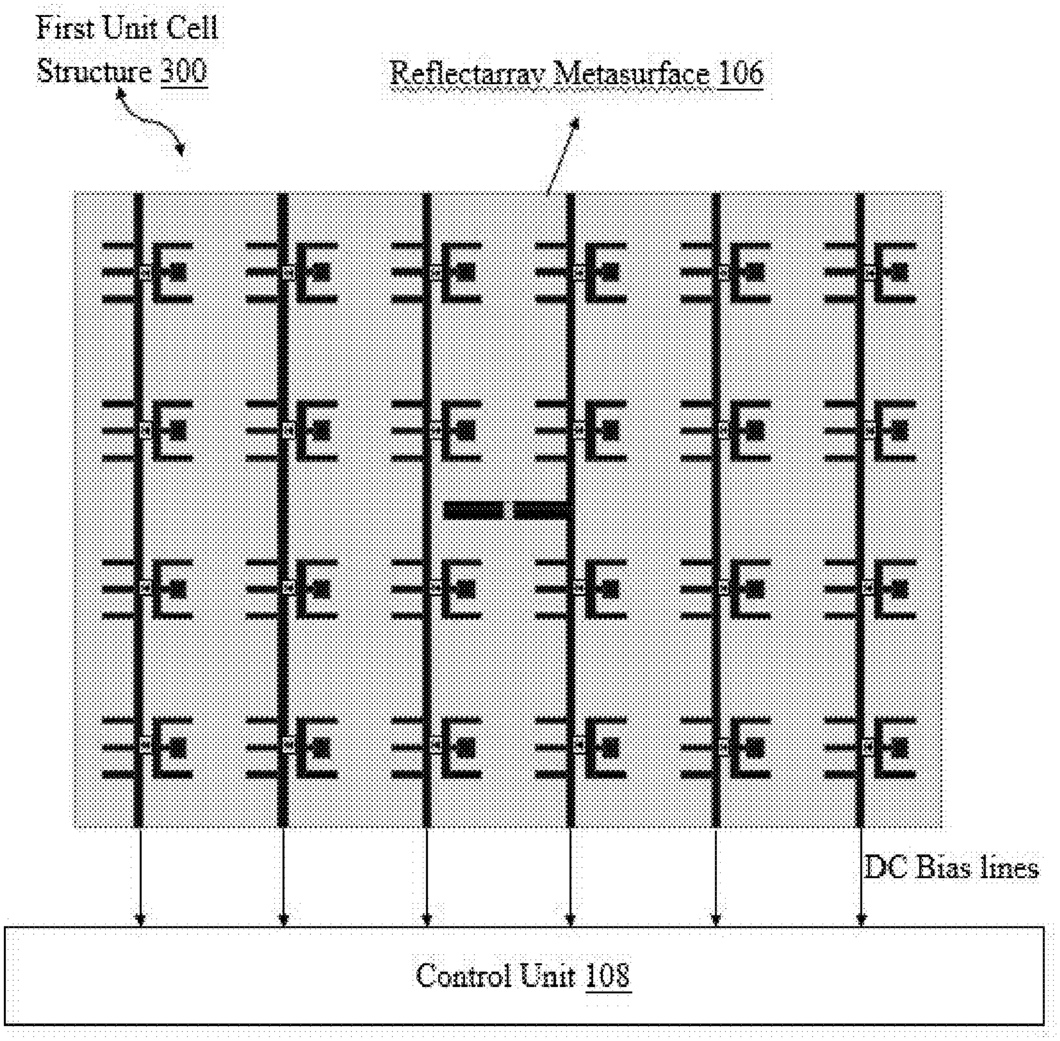
FIGS. 16A, and 16 B illustrates a schematic diagram of a top view and a side view, respectively for feeding the DC bias voltage to the varactor diode, for beam steering the reflectarrray metasurface created by using the plurality of comb-shaped unit cells of the first unit cell structure, in accordance with some embodiments of the present disclosure.
Figure 16B:
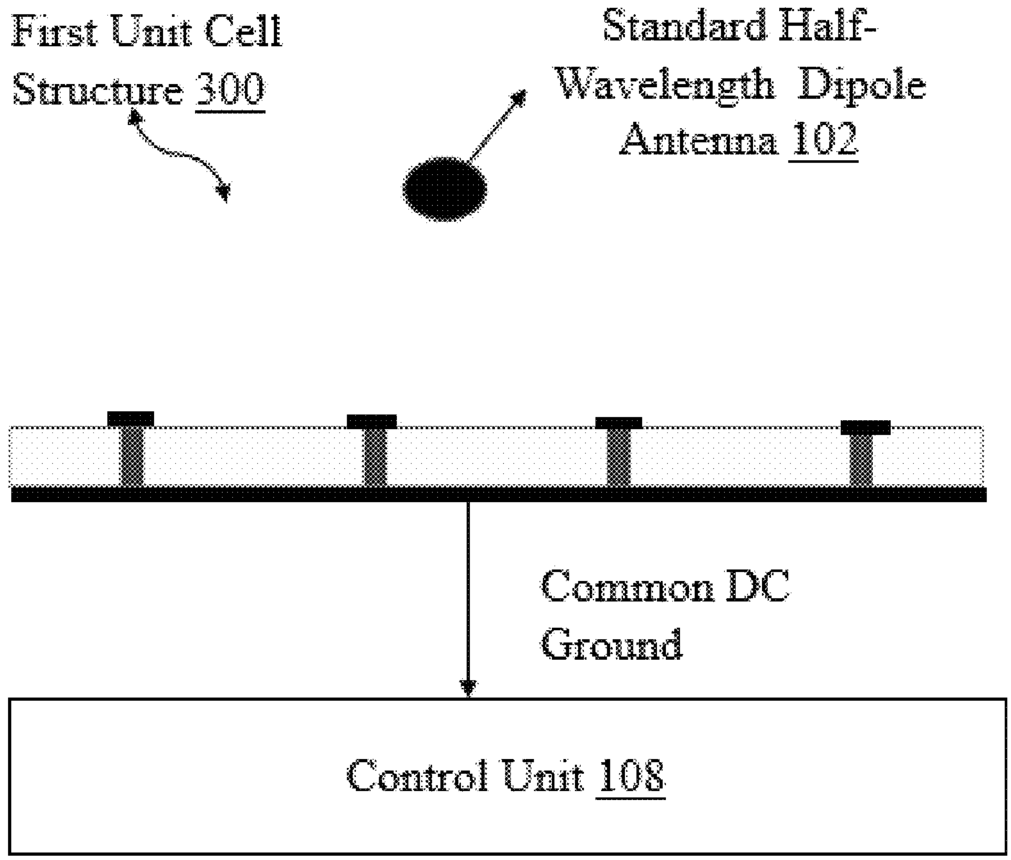

FIGS. 16A, and 16B illustrates a schematic diagram of a top view and a side view, respectively for feeding the DC bias voltage to the varactor diode 306, for beam steering the reflectarrray metasurface 106 created by using the plurality of comb-shaped unit cells 106A of first unit cell structure 300, in accordance with some embodiments of the present disclosure. For beam steering the reflectarray metasurface 106 created using the plurality of comb-shaped unit cells, specific DC reverse bias voltages are fed to the varactor diode 306 embedded in each of the plurality of comb-shaped unit cells 106A. The DC revere bias voltages are fed from a microcontroller-based control unit to the columns through direct connect to the first trunk 302A. The DC return path from the microcontroller-based control unit is connected to the copper bottom layer reflector 106C. The DC reverse bias voltage setting is user configurable.

Figure 17A:
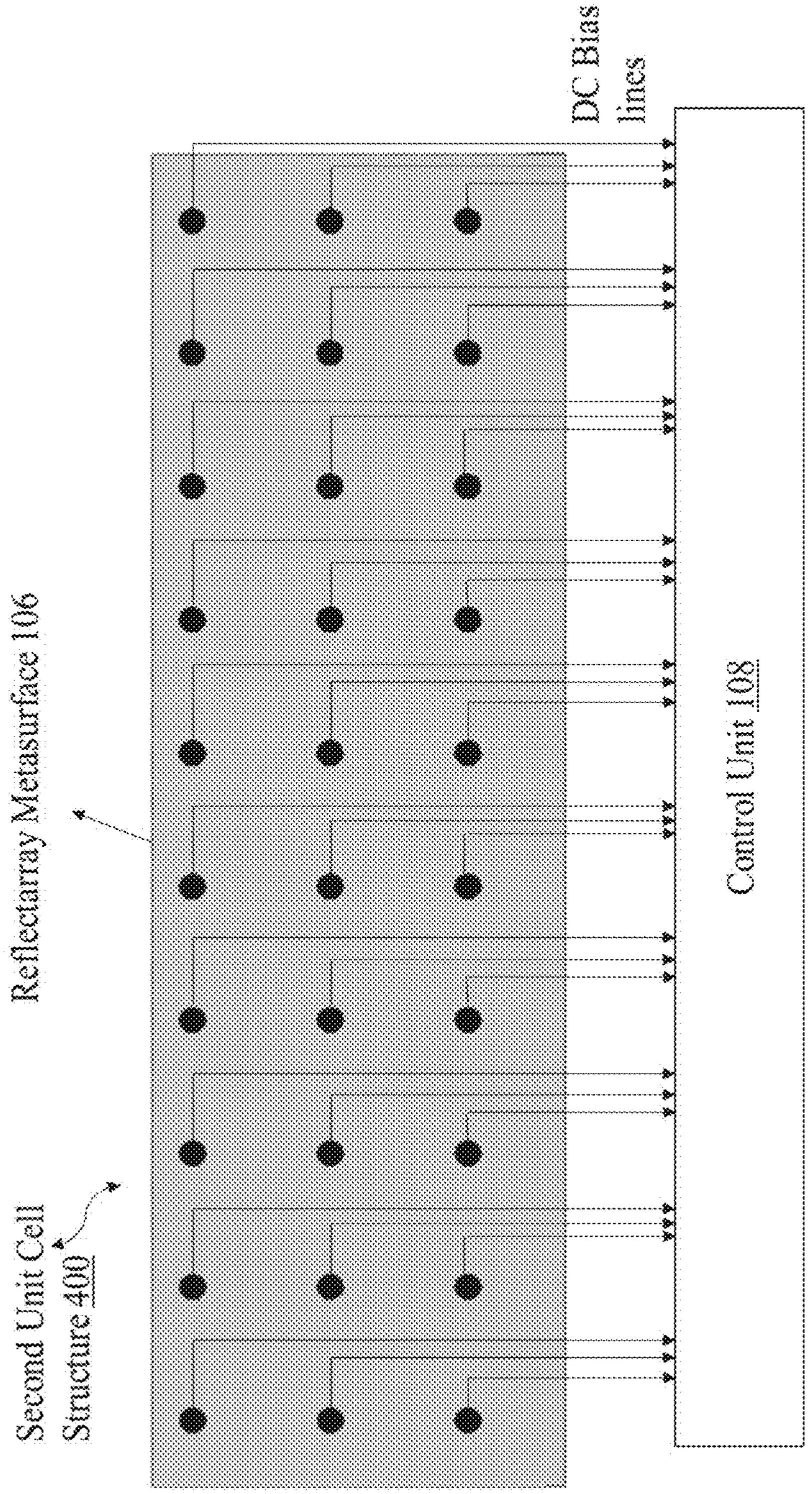
FIGS. 17A, and 17B illustrates a schematic diagram of a top view and a side view, respectively for feeding the DC bias voltage to the varactor diode, for beam steering the reflectarrray metasurface created by using the plurality of comb-shaped unit cells of the second unit cell structure, in accordance with some embodiments of the present disclosure.
Figure 17B:
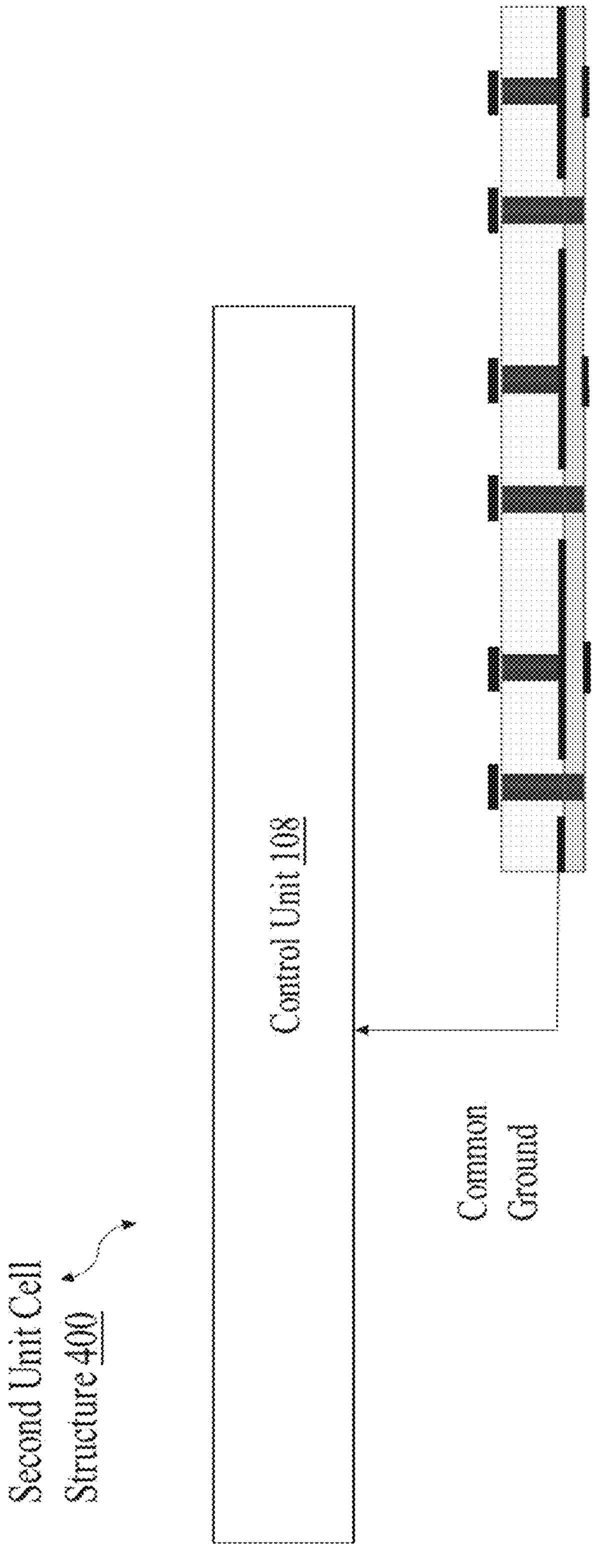

FIGS. 17A, and 17B illustrates a schematic diagram of a top view and a side view, respectively for feeding the DC bias voltage to the varactor diode 306, for beam steering the reflectarrray metasurface 106 created by using the plurality of comb-shaped unit cells 106A of the second unit cell structure 400, in accordance with some embodiments of the present disclosure. For beam steering the reflectarray metasurface 106 created using the plurality of comb-shaped unit cells 106A, specific DC reverse bias voltages are fed to the varactor diode 306 embedded in each of the plurality of comb-shaped unit cells 106A. Here the DC return path is connected to the copper bottom layer reflector 106C and each copper patch in the additional copper layer 106E is individually fed with reconfigurable DC bias.

The reflectarray metasurface 106 constructed with the plurality of comb-shaped unit cells of the first unit cell structure 300 can perform the beam steering only in one plane. The reflectarray metasurface 106 constructed with the plurality of comb-shaped unit cells of the second unit cell structure 400 can perform the beam steering simultaneously along both orthogonal planes.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The present disclosure herein addresses design of the plurality of comb-shaped unit cells 106A arranged over the reflectarray metasurface 106. The plurality of comb-shaped unit cells 106A is designed as one of (i) the first unit cell structure 300 and (ii) the second unit cell structure 400 and further optimized by using the optimization technique. Further the standard half-wavelength dipole antenna 102 is integrated with the proposed reflectarray metasurface 106 to produce electronically steerable antenna in the desired direction.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. An electronic beam-steering reflectarray antenna system comprising:

- a reflectarray metasurface positioned at a predetermined height below a standard half-wavelength dipole antenna; and
- plurality of comb-shaped unit cells arranged as a matrix over the reflectarray metasurface, wherein each of the plurality of comb-shaped unit cells is designed as one of (i) a first unit cell structure, and (ii) a second unit cell structure, and wherein the first unit cell structure comprises:
  - a comb shaped structure with a comb shaped first part and a comb shaped second part separated by a predefined gap to mount a varactor diode at a designated position, wherein the comb shaped first part comprises a first trunk, and a plurality of first arms comprising a first top arm, a first center arm and a first bottom arm, wherein the comb shaped second part comprises a second trunk, and a plurality of second arms comprising a second top arm, a second center arm, and a second bottom arm, and a structural design of the first trunk, the second trunk, the plurality of first arms and the plurality of second arms comprises a copper bottom layer reflector, a first dielectric substrate separating the copper bottom layer reflector and the comb shaped structure, wherein the first trunk and the second trunk has one or more X-directed copper patches, and the plurality of first arms and the plurality of second arms has a single Y-directed copper patch, wherein the first trunk spans across a length of the comb-shaped unit cell along the X-direction, wherein the second center arm is of fixed length and connected to the copper bottom layer reflector through a first cylindrical metal post, and wherein a DC voltage is fed to a mounted varactor diode through the first trunk; and
  - wherein the design of the second unit cell structure comprises:
  - a variation to the first unit cell structure with an additional copper layer positioned below the copper bottom layer reflector through a hole with the second cylindrical metal post from the first center arm, a second dielectric substrate separating the copper bottom layer reflector and the additional copper layer, and wherein the length of the first trunk is less than the length of the comb-shaped unit cell structure in the X-direction.

2. The electronic beam-steering reflectarray antenna system of claim 1, wherein the electronic beam-steering reflectarray system is controlled by a control unit comprising one or more hardware processors, coupled to a memory via one or more communication interfaces.

3. The electronic beam-steering reflectarray antenna system of claim 1, wherein the one or more hardware processors of the control unit are configured by instructions to execute an optimization technique for optimizing the design of the first unit cell structure by:

- performing a simulation comprising a mode1 simulation and a mode2 simulation on the first unit cell structure to (i) obtain an optimum comb arm length corresponding to the plurality of first arms, the second top arm, and the second bottom arm, and (ii) estimate a plurality of reflection phase responses by:
  - (a) setting a plurality of parameters of the first unit cell structure as constant values except comb arm length corresponding to the plurality of first arms, the second top arm, and the second bottom arm;
  - (b) obtaining a plurality of frequency variations of an incident electromagnetic wave and a corresponding plurality of reflection phase responses of a reflected beam, without mounting the varactor diode on the first unit cell structure for a plurality of comb arm length variations, wherein the comb arm length varies between first value and a second value by steps of a predefined value, wherein varying the comb arm length enables the plurality of frequency variations between a first frequency value and a second frequency value of the electromagnetic wave incident on the first unit cell structure, wherein the mode1 simulation comprises field lines of an electromagnetic wave incident parallel to the first trunk, and wherein the mode2 simulation comprises field lines of the electromagnetic wave incident parallel to the plurality of first arms;
  - (c) obtaining the optimum comb arm length among the plurality of comb arm length variations from one of (i) the mode1 simulation and (ii) the mode2 simulation, where an optimum comb arm length results in a reflection phase response of the plurality of reflection phase responses at a desired frequency of operation of the plurality of frequency variations that is greater than a predefined reflection phase and for a desired frequency of operation of the plurality of frequency variations;
  - (d) mounting the varactor diode across the predefined gap between the comb shaped first part and the comb shaped second part; and
  - (e) obtaining the plurality of reflection phase responses for each of the plurality of capacitance values of the DC voltage of the varactor diode for the obtained optimum comb arm length and the desired frequency of operation.

4. The electronic beam-steering reflectarray antenna system of claim 2, wherein the one or more hardware processors of the control unit are configured by instructions to execute an optimization technique for optimizing the design of the second unit cell structure by:

- performing a simulation comprising a mode1 simulation and a mode2 simulation on the second unit cell structure to (i) obtain the optimum comb arm length corresponding to the plurality of first arms, the second top arm, and the second bottom arm and an optimum comb trunk length corresponding to first trunk, and (ii) estimate the plurality of reflection phase responses by:

(a) setting the plurality of parameters of the second unit cell structure as constant values except the comb arm length corresponding to the plurality of first arms, the second top arm, and the second bottom arm, and length of the first trunk;

(b) obtaining the plurality of frequency variations of an incident electromagnetic wave and the corresponding plurality of reflection phase responses of the reflected beam, without mounting the varactor diode on the second unit cell structure, for the plurality of comb arm length variations, wherein the comb arm length varies between the first value and the second value by steps of the predefined value, wherein initially the length of the first trunk initialized with length of the comb-shaped unit cell;

(c) obtaining the optimum comb arm length among the plurality of comb arm length variations from one of (i) the mode1 simulation and (ii) the mode2 simulation, where an optimum comb arm length results in the reflection phase response of the plurality of reflection phase responses at a desired frequency of operation of the plurality of frequency variations that is greater than the predefined reflection phase response and for the desired frequency of operation of the plurality of frequency variations;

(d) obtaining the plurality of frequency variations of an incident electromagnetic wave and a corresponding plurality of reflection phase responses of the reflected beam, without mounting the varactor diode on the second unit cell structure, for the plurality of comb trunk length variations, wherein the comb trunk length varies between a first trunk length value and a second trunk length value by steps of a predefined trunk length value;

(e) obtaining the optimum comb trunk length among the plurality of comb trunk length variations from one of (i) the mode1 simulation and (ii) the mode2 simulation, where the reflection phase response of the plurality of reflection phase responses greater than the predefined reflection phase for the desired frequency of operation of the plurality of frequency variations;

(f) mounting the varactor diode across the predefined gap between the comb shaped first part and the comb shaped second part; and (g) obtaining the plurality of reflection phase responses for each of the plurality of capacitance values of the DC voltage of the varactor diode for the obtained optimum comb arm length, the optimum comb trunk length, and the desired frequency of operation.

5. The electronic beam-steering reflectarray antenna system of claim 2, wherein the one or more hardware processors are configured by the instructions to tilt the reflected beam in a desired direction, from the obtained plurality of reflection phase responses by:

identifying a reflection phase gradient of the reflectarray meta surface, from a plurality reflection phase responses corresponding to each of the plurality of unit cells for a desired angle received from a user;

obtaining a capacitance value of a plurality of capacitance values, for each of the plurality of unit cells, from the reflection phase gradient;

mapping the obtained plurality of capacitance values to the DC voltages corresponding to the varactor diodes using a predefined lookup table; and applying suitable DC voltage to the varactor diode in each of the plurality of unit cells, to tilt the reflected beam over the desired direction.

6. A processor implemented method comprising:

optimizing, via an optimization technique executed by one or more hardware processors of a control unit controlling an electronic beam-steering reflectarray antenna system, a design of one of (i) a first unit cell structure and (ii) a second unit cell structure of a comb shaped unit cell of the electronic beam-steering reflectarray antenna system, wherein the first unit cell structure comprises:

a comb shaped structure with a comb shaped first part and a comb shaped second part separated by a predefined gap to mount a varactor diode at a designated position, wherein the comb shaped first part comprises a first trunk, and a plurality of first arms comprising a first top arm, a first center arm and a first bottom arm, wherein the comb shaped second part comprises a second trunk, and a plurality of second arms comprising a second top arm, a second center arm, and a second bottom arm, and a structural design of the first trunk, the second trunk, the plurality of first arms and the plurality of second arms comprises a copper bottom layer reflector, a first dielectric substrate separating the copper bottom layer reflector and the comb shaped structure, wherein the first trunk and the second trunk has one or more X-directed copper patches, and the plurality of first arms and the plurality of second arms has a single Y-directed copper patch, wherein the first trunk spans across a length of the comb-shaped unit cell along the X-direction, wherein the second center arm is of fixed length and connected to the copper bottom layer reflector through a first cylindrical metal post, and wherein a DC voltage is fed to a mounted varactor diode through the first trunk; and wherein the second unit cell structure comprises a variation to the first unit cell structure with an additional copper layer positioned below the copper bottom layer reflector through a hole with the second cylindrical metal post from the first center arm, a second dielectric substrate separating the copper bottom layer reflector and the additional copper layer, and wherein the length of the first trunk is less than the length of the comb-shaped unit cell structure in the X-direction, wherein the optimization technique of the first unit cell structure comprises:

performing a simulation comprising a mode1 simulation and a mode2 simulation on the first unit cell structure to (i) obtain an optimum comb arm length corresponding to the plurality of first arms, a second top arm, and a second bottom arm and (ii) estimate a plurality of reflection phase responses by:

(a) setting a plurality of parameters of the first unit cell structure as constant values except comb arm length corresponding to the plurality of first arms, the second top arm, and the second bottom arm;

(b) obtaining a plurality of frequency variations of an incident electromagnetic wave and a corresponding plurality of reflection phase responses of a reflected beam, without mounting the a varactor diode on the first unit cell structure, for a plurality of comb arm length variations, wherein the comb arm length varies between first value and a second value by steps of a predefined value, wherein varying the comb arm length enables the plurality of frequency variations between a first frequency value and a second frequency value of the electromagnetic wave incident on the first unit cell structure, wherein the mode1 simulation comprises field lines of an electromagnetic wave incident parallel to a first trunk, and wherein the mode2 simulation comprises field lines of the electromagnetic wave incident parallel to the plurality of first arms;

(c) obtaining the optimum comb arm length among the plurality of comb arm length variations from one of (i) the mode1 simulation and (ii) the mode2 simulation where an optimum comb arm length results in a reflection phase response of the plurality of reflection phase responses at a desired frequency of operation of the plurality of frequency variations that is greater than a predefined reflection phase and for a desired frequency of operation of the plurality of frequency variations;

(d) mounting the varactor diode across the predefined gap between the comb shaped first part and the comb shaped second part;

(e) obtaining the plurality of reflection phase responses for each of the plurality of capacitance values of the DC voltage of the varactor diode for the obtained optimum comb arm length and the desired frequency of operation; and optimizing the design of the second unit cell structure using the optimization technique comprises:

performing a simulation comprising the mode1 simulation and a the mode2 simulation on the second unit cell structure (i) to obtain the optimum comb arm length corresponding to the plurality of first arms, the second top arm, and the second bottom arm and an optimum comb trunk length corresponding to the first trunk, and (ii) to estimate the plurality of reflection phase responses by:

(a) setting the plurality of parameters of the second unit cell structure as constant values except the comb arm length corresponding to the plurality of first arms, the second top arm, and the second bottom arm, and length of the first trunk;

(b) obtaining the plurality of frequency variations of an incident electromagnetic wave and the corresponding plurality of reflection phase responses of the reflected beam, without mounting the varactor diode on the second unit cell structure, for the plurality of comb arm length variations, wherein the comb arm length varies between first value and a second value by steps of a predefined value, wherein initially the length of the first trunk initialized with length of the comb-shaped unit cell;

(c) obtaining the optimum comb arm length among the plurality of comb arm length variations from one of (i) the mode1 simulation and (ii) the mode2 simulation, wherein an optimum comb arm length results in the reflection phase response of the plurality of reflection phase responses at a desired frequency of operation of the plurality of frequency variations that is greater than the predefined reflection phase and for the desired frequency of operation of the plurality of frequency variations;

(d) obtaining the plurality of frequency variations of an incident electromagnetic wave and the corresponding plurality of reflection phase responses of the reflected beam, without mounting the varactor diode on the second unit cell structure, for the plurality of comb trunk length variations, wherein the comb trunk length varies between a first trunk length value and a second trunk length value by steps of the predefined value;

(e) obtaining the optimum comb trunk length among the plurality of comb trunk length variations from one of (i) the mode1 simulation and (ii) the mode2 simulation with the reflection phase response of the plurality of reflection phase responses greater than the predefined reflection phase for the desired frequency of operation of the plurality of frequency variations;

(f) mounting the varactor diode across the predefined gap between the comb shaped first part and the comb shaped second part; and (g) obtaining the plurality of reflection phase responses for each of the plurality of capacitance values of the DC voltage of the varactor diode for the obtained optimum comb arm length, the optimum comb trunk length, and the desired frequency of operation.

7. The processor implemented method of claim 6 comprising tilting the reflected beam in a desired direction from the obtained plurality of reflection phase responses by:

identifying a reflection phase gradient of the reflectarray meta surface, from a plurality reflection phase responses corresponding to each of the plurality of unit cells for a desired angle received from a user;

obtaining a capacitance value of a plurality of capacitance values, for each of the plurality of unit cells, from the reflection phase gradient;

mapping the obtained plurality of capacitance values to the DC voltages corresponding to the varactor diodes using a predefined lookup table; and applying suitable DC voltage to the varactor diode in each of the plurality of unit cells, to tilt the reflected beam over the desired direction.

8. One or more non-transitory machine-readable information storage mediums comprising one or more instructions which, when executed by one or more hardware processors, cause:

optimizing, via an optimization technique of a control unit controlling an electronic beam-steering reflectarray antenna system, a design of one of (i) a first unit cell structure and (ii) a second unit cell structure of a comb shaped unit cell of the electronic beam-steering reflectarray antenna system, wherein the first unit cell structure comprises:

a comb shaped structure with a comb shaped first part and a comb shaped second part separated by a predefined gap to mount a varactor diode at a designated position, wherein the comb shaped first part comprises a first trunk, and a plurality of first arms comprising a first top arm, a first center arm and a first bottom arm, wherein the comb shaped second part comprises a second trunk, and a plurality of second arms comprising a second top arm, a second center arm, and a second bottom arm, and a structural design of the first trunk, the second trunk, the plurality of first arms and the plurality of second arms comprises a copper bottom layer reflector, a first dielectric substrate separating the copper bottom layer reflector and the comb shaped structure, wherein the first trunk and the second trunk has one or more X-directed copper patches, and the plurality of first arms and the plurality of second arms has a single Y-directed copper patch, wherein the first trunk spans across a length of the comb-shaped unit cell along the X-direction, wherein the second center arm is of fixed length and connected to the copper bottom layer reflector through a first cylindrical metal post, and wherein a DC voltage is fed to a mounted varactor diode through the first trunk; and wherein the second unit cell structure comprises a variation to the first unit cell structure with an additional copper layer positioned below the copper bottom layer reflector through a hole with the second cylindrical metal post from the first center arm, a second dielectric substrate separating the copper bottom layer reflector and the additional copper layer, and wherein the length of the first trunk is less than the length of the comb-shaped unit cell structure in the X-direction;

wherein the optimization technique of the first unit cell structure comprises:

performing a simulation comprising a mode1 simulation and a mode2 simulation on the first unit cell structure to (i) obtain an optimum comb arm length corresponding to the plurality of first arms, the second top arm, and the second bottom arm and (ii) estimate a plurality of reflection phase responses by:

(a) setting a plurality of parameters of the first unit cell structure as constant values except comb arm length corresponding to the plurality of first arms, the second top arm, and the second bottom arm;

(b) obtaining a plurality of frequency variations of an incident electromagnetic wave and a corresponding plurality of reflection phase responses of a reflected beam, without mounting the varactor diode on the first unit cell structure, for a plurality of comb arm length variations, wherein the comb arm length varies between first value and a second value by steps of a predefined value, wherein varying the comb arm length enables the plurality of frequency variations between a first frequency value and a second frequency value of the electromagnetic wave incident on the first unit cell structure, wherein the mode1 simulation comprises field lines of an electromagnetic wave incident parallel to a first trunk, and wherein the mode2 simulation comprises field lines of the electromagnetic wave incident parallel to the plurality of first arms;

(c) obtaining the optimum comb arm length among the plurality of comb arm length variations from one of (i) the mode1 simulation and (ii) the mode2 simulation where an optimum comb arm length results in a reflection phase response of the plurality of reflection phase responses at a desired frequency of operation of the plurality of frequency variations that is greater than a predefined reflection phase and for a desired frequency of operation of the plurality of frequency variations;

(d) mounting the varactor diode across the predefined gap between the comb shaped first part and the comb shaped second part;

(e) obtaining the plurality of reflection phase responses for each of the plurality of capacitance values of the DC voltage of the varactor diode for the obtained optimum comb arm length and the desired frequency of operation; and optimizing the design of the second unit cell structure using the optimization technique comprises:

performing a simulation comprising the mode1 simulation and the mode2 simulation on the second unit cell structure, (i) to obtain the optimum comb arm length corresponding to the plurality of first arms, the second top arm, and the second bottom arm and an optimum comb trunk length corresponding to the first trunk, and (ii) to estimate the plurality of reflection phase responses by:

(a) setting the plurality of parameters of the second unit cell structure as constant values except the comb arm length corresponding to the plurality of first arms, the second top arm, and the second bottom arm, and length of the first trunk;

(b) obtaining the plurality of frequency variations of an incident electromagnetic wave and the corresponding plurality of reflection phase responses of the reflected beam, without mounting the varactor diode on the second unit cell structure, for the plurality of comb arm length variations, wherein the comb arm length varies between first value and a second value by steps of a predefined value, wherein initially the length of the first trunk is initialized with the length of the comb-shaped unit cell;

(c) obtaining the optimum comb arm length among the plurality of comb arm length variations from one of (i) the mode1 simulation and (ii) the mode2 simulation, wherein an optimum comb arm length results in the reflection phase response of the plurality of reflection phase responses at a desired frequency of operation of the plurality of frequency variations that is greater than the predefined reflection phase and for the desired frequency of operation of the plurality of frequency variations;

(d) obtaining the plurality of frequency variations of an incident electromagnetic wave and the corresponding plurality of reflection phase responses of the reflected beam, without mounting the varactor diode on the second unit cell structure, for the plurality of comb trunk length variations, wherein the comb trunk length varies between a first trunk length value and a second trunk length value by steps of the predefined value;

(e) obtaining the optimum comb trunk length among the plurality of comb trunk length variations from one of (i) the mode1 simulation and (ii) the mode2 simulation with the reflection phase response of the plurality of reflection phase responses greater than the predefined reflection phase for the desired frequency of operation of the plurality of frequency variations;

(f) mounting the varactor diode across the predefined gap between the comb shaped first part and the comb shaped second part; and (g) obtaining the plurality of reflection phase responses for each of the plurality of capacitance values of the DC voltage of the varactor diode for the obtained optimum comb arm length, the optimum comb trunk length, and the desired frequency of operation.

9. The one or more non-transitory machine-readable information storage mediums of claim 8 comprising tilting the reflected beam in a desired direction, from the obtained plurality of reflection phase responses by:

identifying a reflection phase gradient of the reflectarray meta surface, from a plurality reflection phase responses corresponding to each of the plurality of unit cells for a desired angle received from a user;

obtaining a capacitance value of a plurality of capacitance values, for each of the plurality of unit cells, from the reflection phase gradient;

mapping the obtained plurality of capacitance values to the DC voltages corresponding to the varactor diodes using a predefined lookup table; and applying suitable DC voltage to the varactor diode in each of the plurality of unit cells, to tilt the reflected beam over the desired direction.

* * * * *